(12) United States Patent
Talavasek et al.

(10) Patent No.: US 10,906,609 B2
(45) Date of Patent: Feb. 2, 2021

(54) EBIKE MOTOR MOUNT

(71) Applicant: Specialized Bicycle Components, Inc., Morgan Hill, CA (US)

(72) Inventors: Jan Talavasek, Knonau (CH); Marco Werner Sonderegger, Benzenschwil (CH); Vincent Patureau, Zurich (CH); Marc Pallure, Zug (CH)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 118 days.

(21) Appl. No.: 16/107,710

(22) Filed: Aug. 21, 2018

(65) Prior Publication Data

US 2020/0062339 A1   Feb. 27, 2020

(51) Int. Cl.
| | |
|---|---|
| *B62M 6/55* | (2010.01) |
| *B62M 6/90* | (2010.01) |
| *B62J 43/13* | (2020.01) |
| *B62K 3/02* | (2006.01) |

(52) U.S. Cl.
CPC ............. *B62M 6/55* (2013.01); *B62J 43/13* (2020.02); *B62M 6/90* (2013.01); *B62K 3/02* (2013.01)

(58) Field of Classification Search
CPC ............ B62M 6/55; B62M 6/90; B62J 43/13
See application file for complete search history.

(56) References Cited

U.S. PATENT DOCUMENTS

| | | | |
|---|---|---|---|
| 4,541,500 | A | 9/1985 | Gelhard |
| 4,591,017 | A | 5/1986 | Enjo et al. |
| 5,570,752 | A | 11/1996 | Takata |
| 5,758,736 | A | 6/1998 | Yamauchi |

(Continued)

FOREIGN PATENT DOCUMENTS

| | | |
|---|---|---|
| DE | 202014100296 U1 | 2/2014 |
| DE | 202015103692 U1 | 7/2015 |

(Continued)

OTHER PUBLICATIONS

International Search Report and Written Opinion for Application No. PCT/US2019/047435 dated Dec. 31, 2019 (15 pages).

(Continued)

*Primary Examiner* — Kevin Hurley
(74) *Attorney, Agent, or Firm* — Michael Best & Friedrich LLP

(57) ABSTRACT

An ebike comprises a front wheel, a rear wheel, and a frame structure supported on the front wheel and the rear wheel. The frame structure includes a main frame having a bottom shell coupling a down tube to a seat tube. The bottom shell at least partially defines a hollow interior. The motor assembly has an upper motor portion positioned in the hollow interior and a lower motor portion hanging below the bottom shell, and the battery assembly is at least partially positioned in the hollow interior, and the battery assembly includes a lower battery portion hanging below the bottom shell. The frame structure may also include a rear frame pivotally coupled to the main frame at a lower pivot axis defining a horizontal plane. The motor assembly may be secured to the bottom shell by a lower fastener below the horizontal plane and an upper fastener above the horizontal plane.

20 Claims, 23 Drawing Sheets

(56) References Cited

U.S. PATENT DOCUMENTS

| | | |
|---|---|---|
| 6,119,801 A | 9/2000 | Yamashita et al. |
| 6,591,929 B1 | 7/2003 | Tsuboi et al. |
| 6,598,693 B2 | 7/2003 | Honda et al. |
| 6,691,813 B2 | 2/2004 | Schless |
| 7,108,097 B1 | 9/2006 | Bolton et al. |
| 7,461,714 B2 | 12/2008 | Holland |
| 7,547,021 B2 | 6/2009 | Bon |
| 7,568,714 B2 | 8/2009 | Sasnowski et al. |
| 8,100,424 B2 | 1/2012 | Jan |
| 8,205,705 B2 | 6/2012 | Li et al. |
| 8,960,355 B2 | 2/2015 | Matsuda |
| 9,580,141 B2 | 2/2017 | Talavasek et al. |
| 9,598,132 B2 | 3/2017 | Eguchi |
| 9,616,966 B2 * | 4/2017 | Talavasek ................ B62M 6/40 |
| 9,634,542 B2 * | 4/2017 | Yao .......................... B62M 6/50 |
| 9,676,443 B2 | 6/2017 | Perkins et al. |
| 9,981,715 B2 * | 5/2018 | Moriyama ............. B62K 19/30 |
| 2004/0089489 A1 | 5/2004 | Schless |
| 2010/0206652 A1 | 8/2010 | Kielland |
| 2013/0241169 A1 | 9/2013 | Talavasek et al. |
| 2013/0241174 A1 | 9/2013 | Meyer et al. |
| 2016/0303961 A1 | 10/2016 | Hendey et al. |
| 2016/0339992 A1 * | 11/2016 | Yoshiie ................... B62M 6/55 |
| 2016/0375956 A1 | 12/2016 | Talavasek et al. |
| 2018/0001785 A1 | 1/2018 | Shimoda et al. |
| 2018/0017152 A1 * | 1/2018 | Emura ................ B62K 25/286 |
| 2019/0112000 A1 * | 4/2019 | Noda ....................... B62M 6/55 |
| 2019/0382067 A1 * | 12/2019 | Muhle ........................ B62J 6/04 |
| 2020/0062341 A1 * | 2/2020 | Talavasek ................ B62J 43/28 |

FOREIGN PATENT DOCUMENTS

| | | |
|---|---|---|
| DE | 202016102118 U1 | 8/2017 |
| DE | 102016205539 B3 | 9/2017 |
| EP | 0818386 A1 | 1/1998 |
| EP | 1193170 A1 | 4/2002 |

OTHER PUBLICATIONS

Elektrofahrrad24, "Haibike Flyon Modelle 2019/Eurobike 2018," <https://www.youtube.com/watch?v=JwyiVYsLMeg> YouTube video, Jul. 20, 2018.

\* cited by examiner

EBIKE MOTOR MOUNT

BACKGROUND

The present invention relates to bicycle having electric motors, or "ebikes," and specifically to a motor for an ebike.

Ebikes have an electric motor and a battery for powering the electric motor. Ebike and motors may be secured to the ebike in some fashion, such as to the bike frame. Also, ebike motors may be housed within a hollow chamber of the ebike frame.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

According to an exemplary embodiment, an ebike comprises a front wheel, a rear wheel, and a frame structure supported on the front wheel and the rear wheel. The frame structure includes a main frame and further includes a rear frame pivotally coupled to the main frame at a lower pivot axis defining a horizontal plane. The main frame includes a head tube, a down tube, a seat tube, and a bottom shell coupling the down tube to the seat tube, the bottom shell including sidewalls at least partially defining a hollow interior. The ebike further comprises a motor assembly having an upper motor portion positioned in the hollow interior of the bottom shell and a lower motor portion hanging below the bottom shell. The motor assembly is secured to the bottom shell by a lower fastener below the horizontal plane and an upper fastener above the horizontal plane. The bottom shell includes a downwardly facing opening at least partially defined by lower edges of the sidewalls.

The ebike may further comprise a battery assembly at least partially positioned in the hollow interior of the bottom shell, the battery assembly including a lower battery portion hanging below the bottom shell. For example, the battery assembly may be slidable from the bottom shell along a battery axis that is parallel to a down tube axis when the motor assembly is secured to the bottom shell. The lower motor portion and the lower battery portion are positioned lower than the main frame and are also positioned lower than the rear frame. Also, each one of the battery assembly and the motor assembly may be able to be removed from the main frame without another one of the battery assembly and motor assembly being removed from the main frame. The ebike may further comprise a motor cover enclosing the lower motor portion.

According to another exemplary embodiment, an ebike comprises a front wheel, a rear wheel, a frame structure supported on the front wheel and the rear wheel, a motor assembly, and a battery assembly. The frame structure includes a main frame having a head tube, a down tube, a seat tube, and a bottom shell coupling the down tube to the seat tube. The bottom shell including sidewalls at least partially defining a hollow interior. The motor assembly has an upper motor portion positioned in the hollow interior of the bottom shell and a lower motor portion hanging below the bottom shell, and the battery assembly is at least partially positioned in the hollow interior of the bottom shell, and the battery assembly includes a lower battery portion hanging below the bottom shell.

Figure 1:
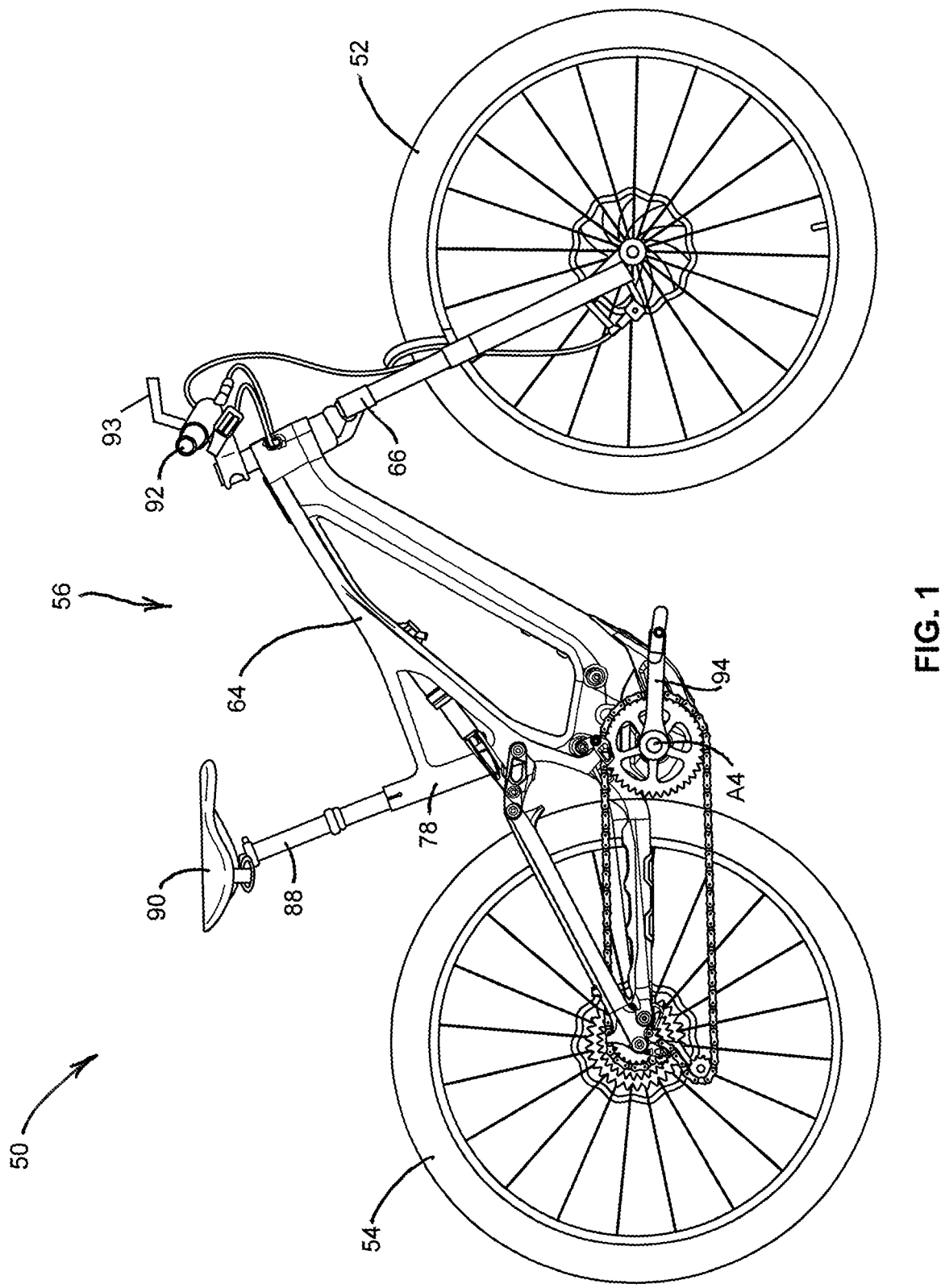
FIG. 1 is a right side view of an ebike including a frame assembly, according to an embodiment.
Figure 2:
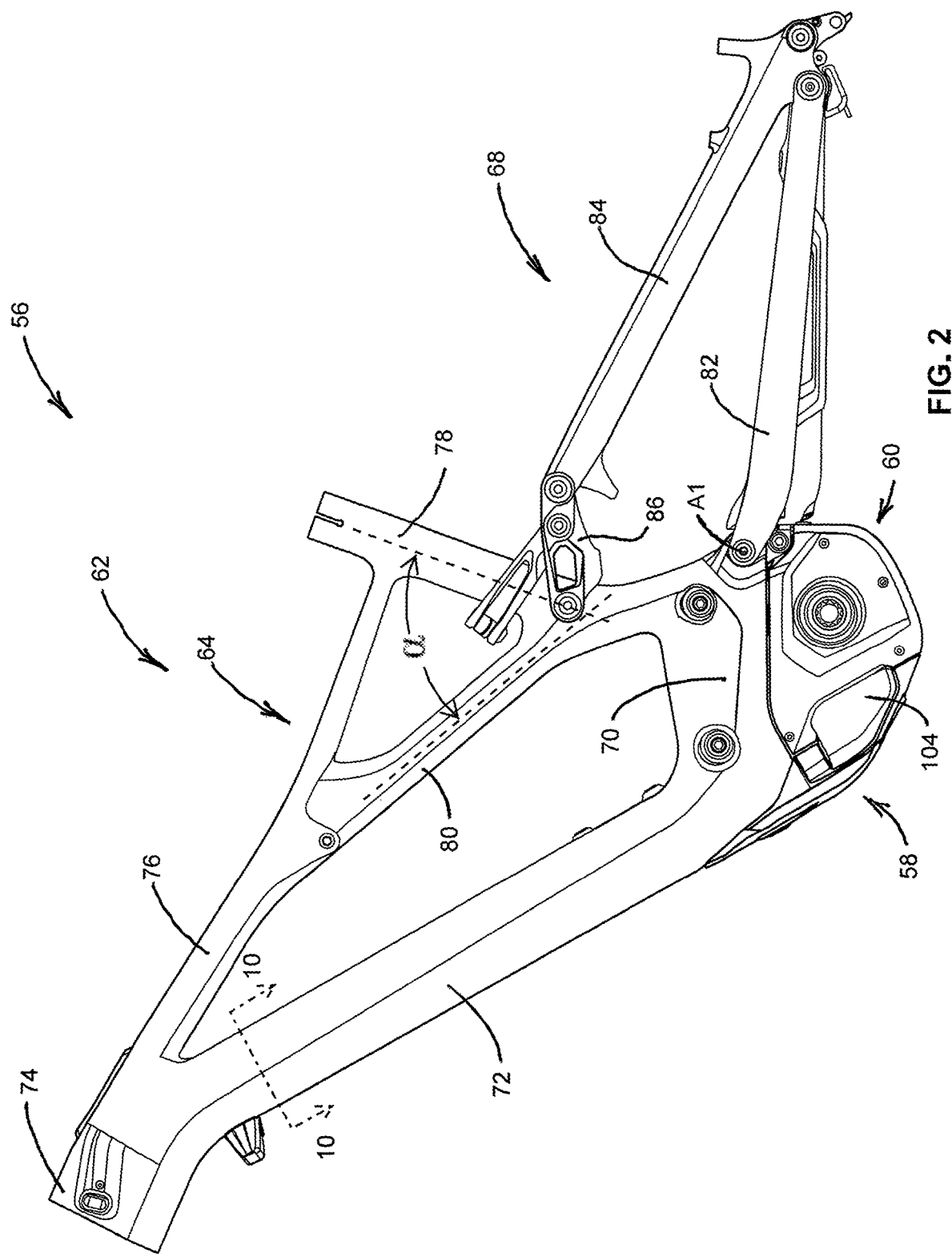
FIG. 2 is left side view of the frame assembly of the ebike in FIG. 1, the frame assembly having a frame structure, a motor assembly, and a battery assembly.
Figure 3:
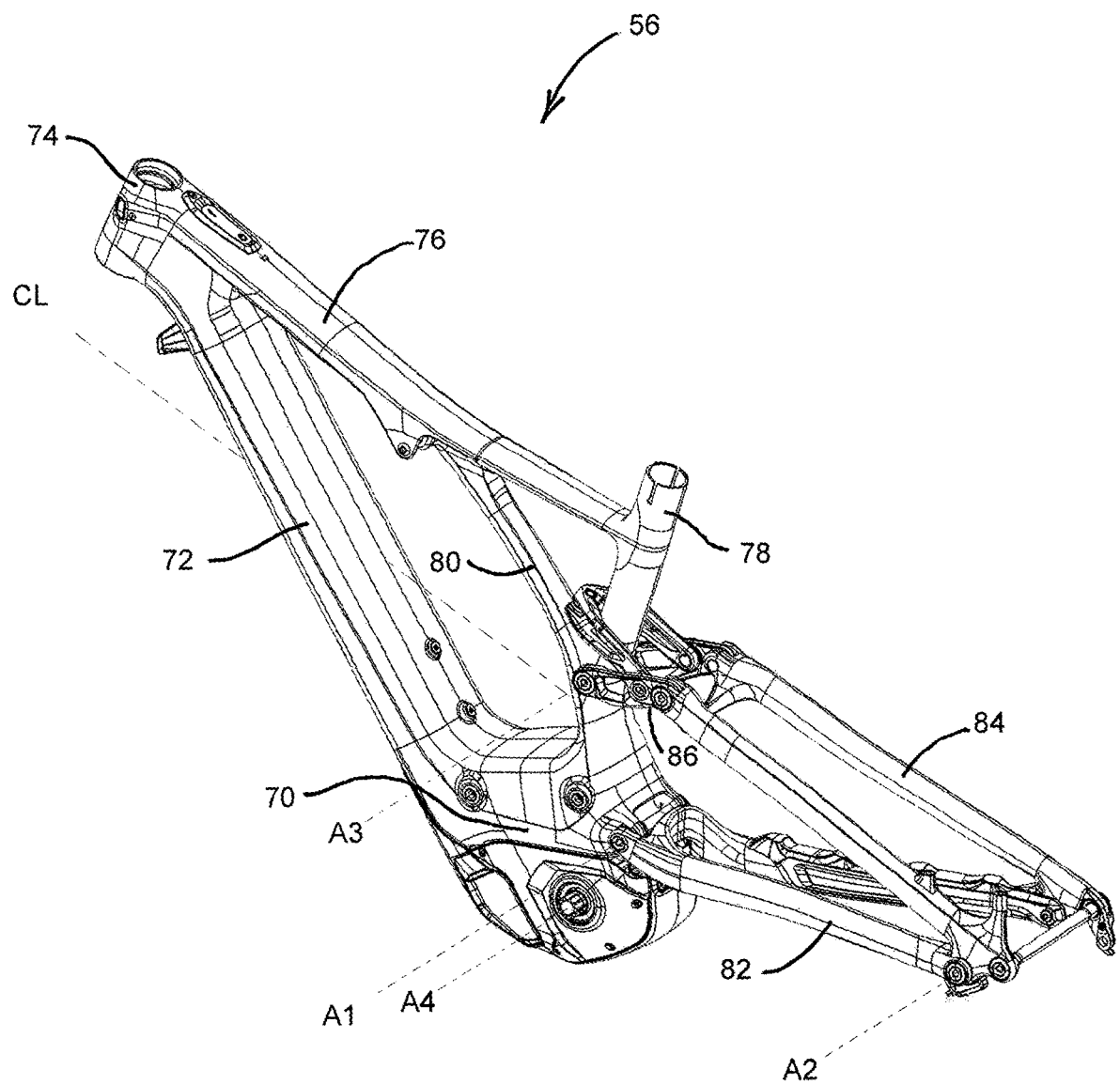
FIG. 3 is a left rear perspective view of the frame assembly in FIG. 2.
Figure 4:
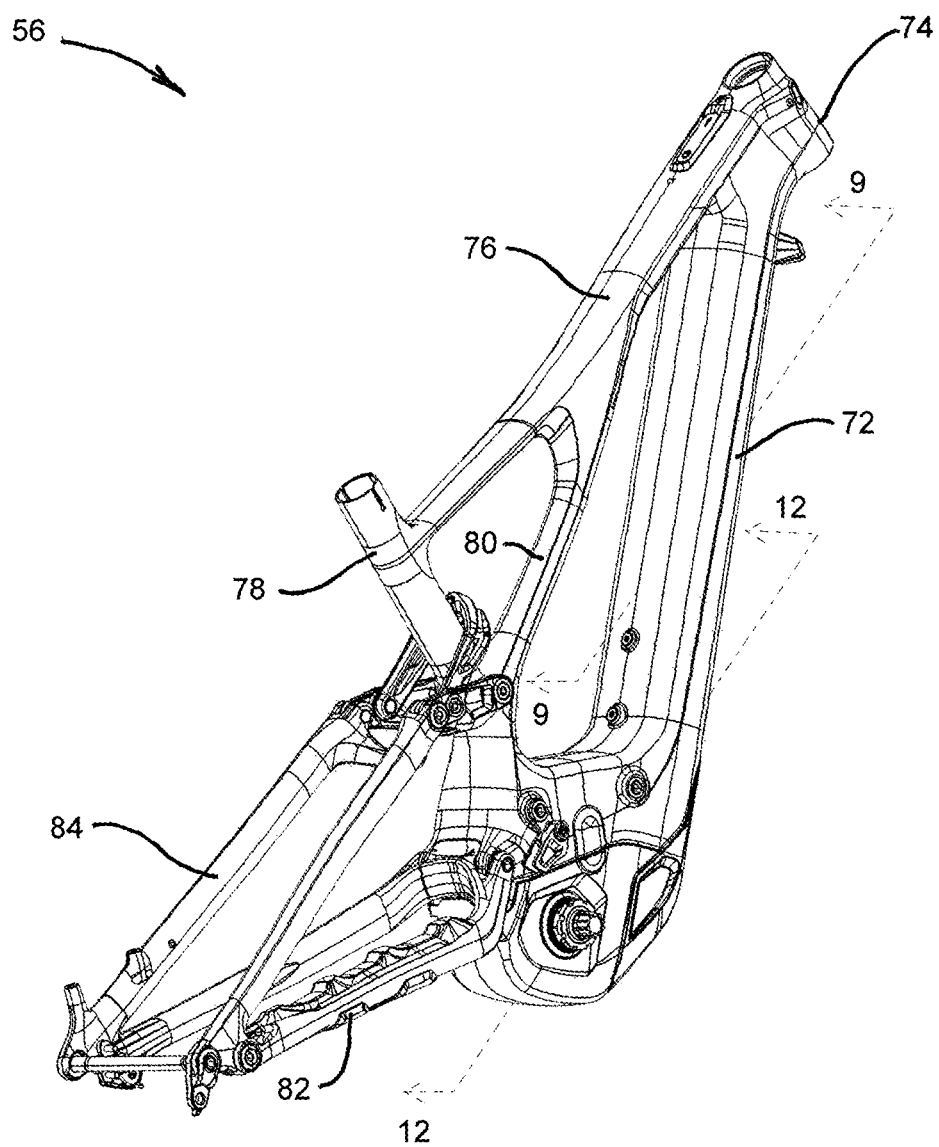
FIG. 4 is a right rear perspective view of the frame assembly in FIG. 2.

Referring now to the illustrated embodiment, FIGS. 1-4 illustrate an ebike 50 having a front wheel 52, a rear wheel 54, and a frame assembly 56 coupled to and supported on the front wheel 52 and rear wheel 54. The frame assembly 56 can include a battery assembly 58, a motor assembly 60, and a frame structure 62. Further, the frame structure 62 can include a main frame 64, a front fork 66 rotationally coupled to and supported on a front part of the main frame 64, and a rear frame 68 coupled (e.g., pivotally coupled) to and supported on a rear part of the main frame 64). The main frame 64 can include a bottom shell 70 and multiple hollow tubes, such as, for example, a down tube 72, a head tube 74, a top tube 76, a seat tube 78, and a diagonal tube in the form of a side tube 80. Side tube 80 can connect top tube 76 to seat tube 78. For example, side tube 80 can connect a mid-portion of the top tube 76 with a mid-portion of the seat tube 78. The bottom shell 70 has primarily a uniform wall thickness. The side tube 80 can be offset to the right side of a vertical center plane defined by a center plane of the rear wheel, which extends through a main frame centerline CL (FIG. 3). Alternatively, the side tube 80 can be aligned with a vertical center plane extending through the main frame centerline CL. In some embodiments, the vertical center plane also can be defined by a seat tube axis of the seat tube 78 and the main frame centerline CL (FIG. 3). The side tube 80 can connect the top tube 76 with the seat tube 78 such that the hollow interiors of those tubes are interconnected. The side tube 80 can be asymmetric to the centerline CL of the main frame 64. For example, the side tube 80 can be located to one side (e.g., a right side) of the centerline CL of the main frame 64. In these or other embodiments, there can be no other side tube on the other side (e.g., a left side) of the centerline CL of the main frame 64. However, in other embodiments, there can be another side tube on the other side (e.g., a left side) of the centerline CL of the main frame 64.

The rear frame 68 can include chainstays 82 coupled (e.g., pivotally coupled) to the bottom shell 70 of the main frame 64. For example, when chainstays 82 are pivotally coupled to the bottom shell 70 of the main frame 64, the chainstays 82 can pivot about a lower pivot axis A1.

Further, the rear frame 68 can include seatstays 84 coupled (e.g., pivotally coupled) to rear ends of the chainstays 82. For example, when seatstays 84 are pivotally coupled to the rear ends of the chainstays 82, the seatstays 84 can pivot about a rear pivot axis A2. Front ends of the seatstays 84 can be coupled (e.g., pivotally coupled) to a pivot link 86, which is coupled (e.g., pivotally coupled) to the seat tube 78 at a link pivot axis A3 positioned at an intersection of the side tube 80 with the seat tube 78.

The ebike 50 further can include a dropper seat post 88 secured to the seat tube 78 and supporting a saddle 90. Handlebars 92 can be coupled to the front fork 66 to facilitate steering of the ebike 50. A user interface 93, such as buttons or a touchscreen, is optional and can be mounted on the handlebars 92 to provide a means for the user to communicate with the ebike 50. A crank assembly 94 can be rotationally supported by the motor assembly 60 to permit pedaling of the ebike 50. The crank assembly 94 can rotate about a crank axis A4.

Figure 5:
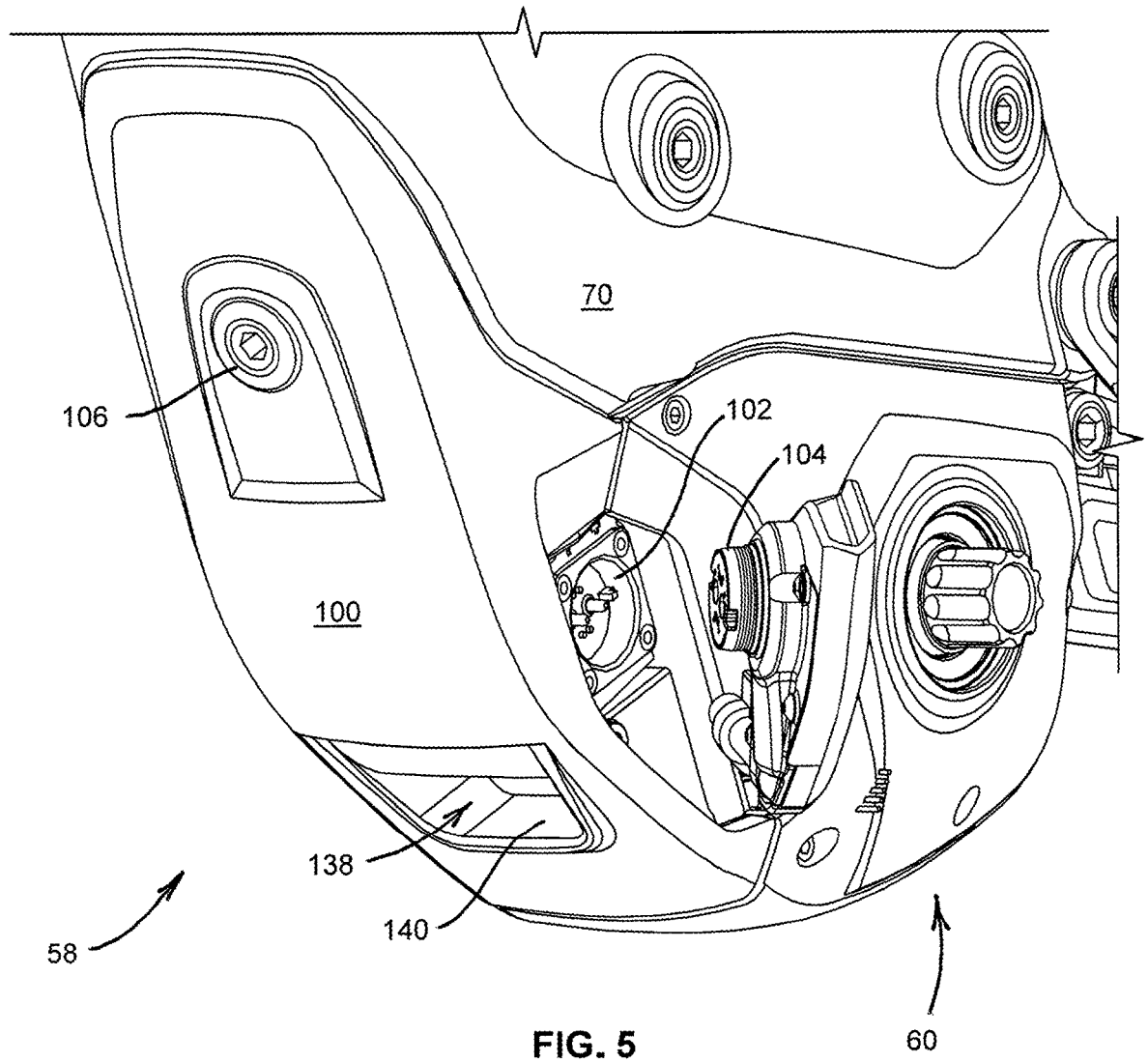
FIG. 5 is an enlarged front perspective view of a bottom shell area of the frame assembly in FIG. 2.
Figure 6:
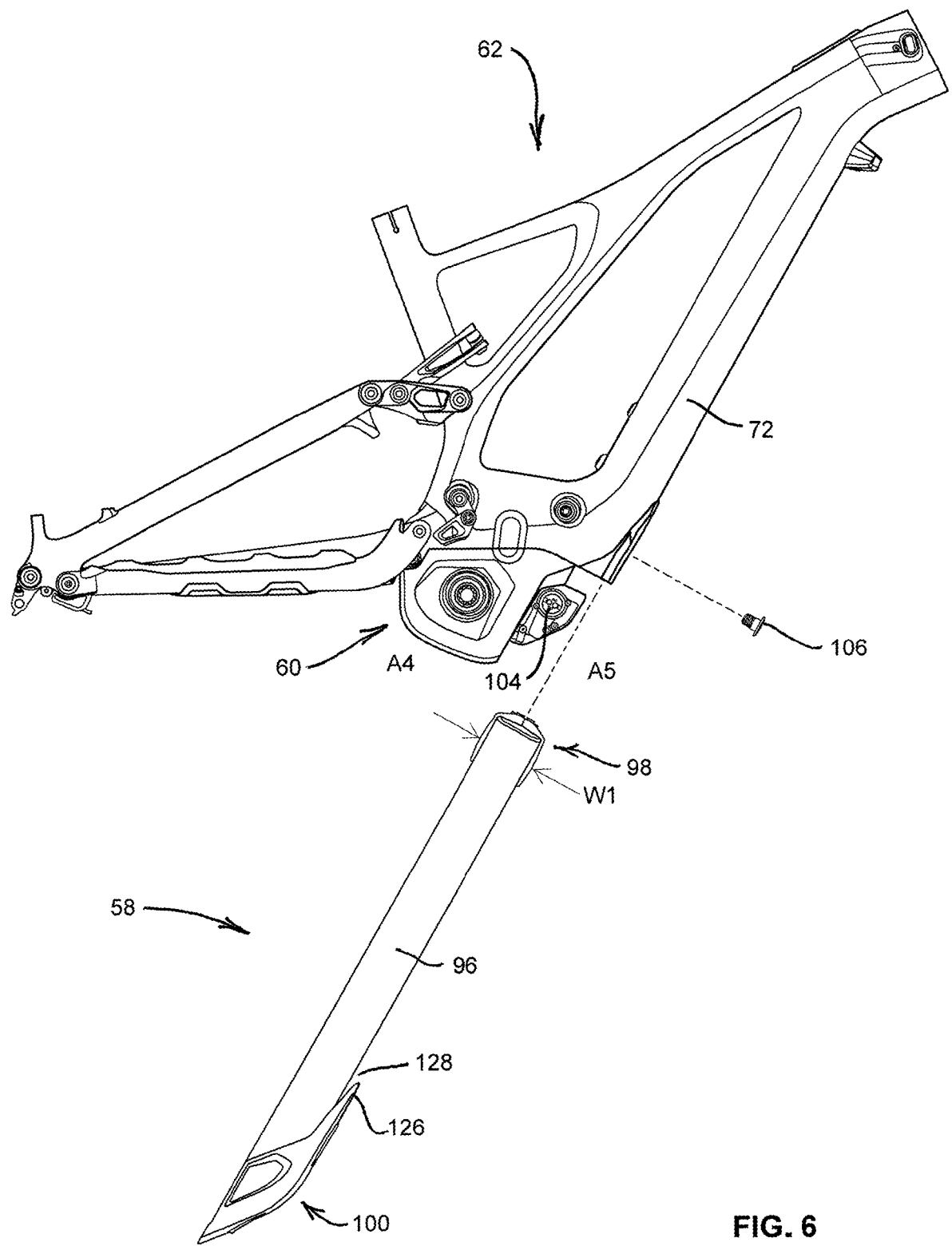
FIG. 6 is a right side view of the frame assembly in FIG. 2 shown with the battery assembly exploded.
Figure 7:
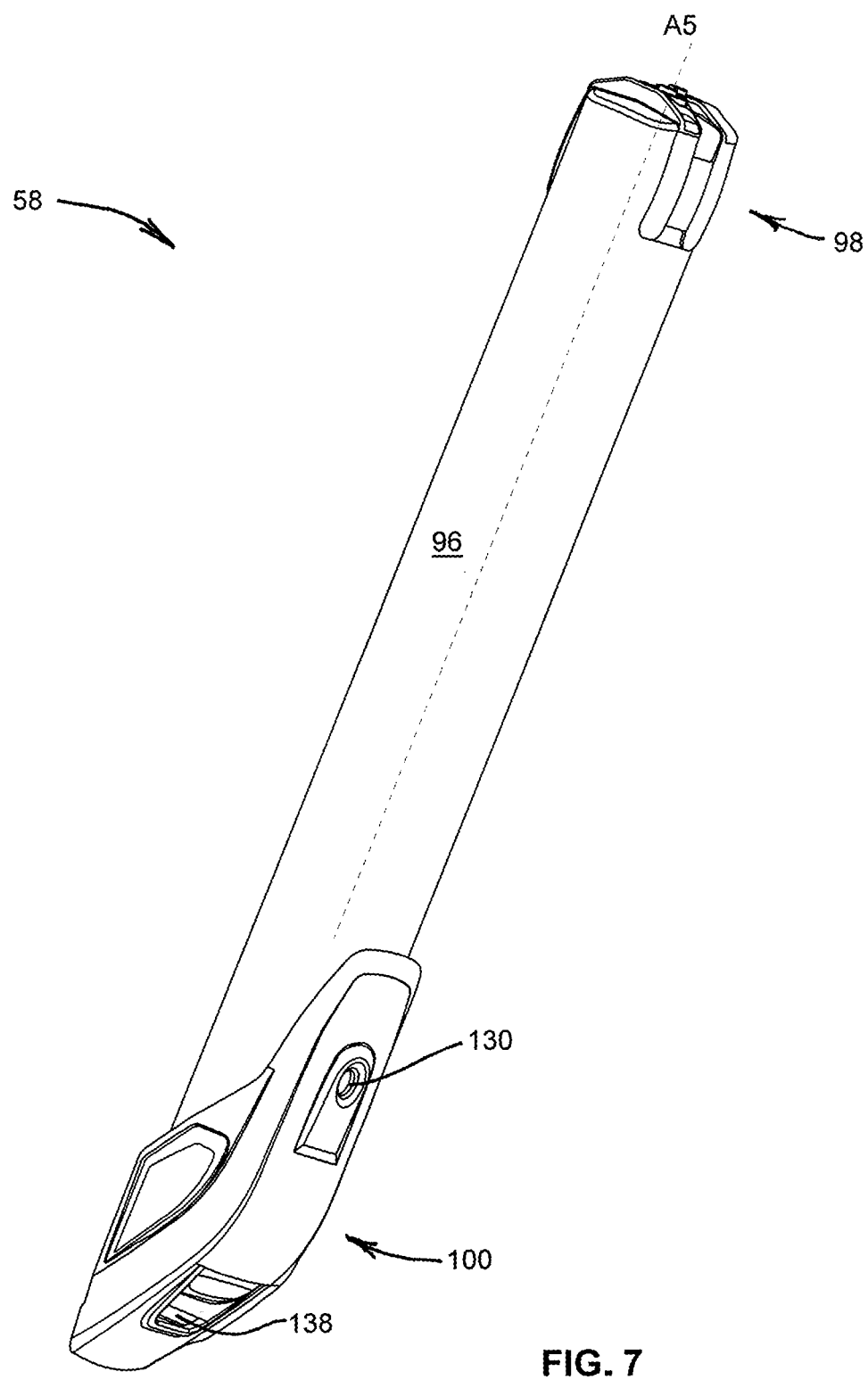
FIG. 7 is a perspective view of the battery assembly shown in FIG. 6.

Referring to FIGS. 5-7, the battery assembly 58 can include a battery housing 96, an upper battery mount 98, a battery cover 100, and a battery socket 102 on its lower end near the motor assembly 60. The battery housing 96 can comprise a sealed, substantially rigid structure that houses battery cells (not shown). The battery socket 102 can be mounted in the battery housing 96 and provides an electrical conduit for electrically coupling the battery cells to the electrical components of the ebike 50. The battery socket 102 can be designed to receive a battery plug 104 that is electrically coupled to the motor assembly 60 and other electrical components of the ebike 50. When the battery plug 104 can be plugged into the battery socket 102, the battery assembly 58 can communicate with and can provide electricity to other electrical components of the ebike 50. In order to recharge the battery cells, the battery plug 104 can be removed from the battery socket 102, and a recharging plug (not shown) can be plugged into the battery socket 102.

Referring to FIG. 6, the battery assembly 58 can be partially positioned in the down tube 72 and can be designed to be slid out of the down tube 72 at a location near the bottom shell 70. In order to remove the battery assembly 58 from the down tube 72, the battery plug 104 first can be unplugged from the battery socket 102, and then a battery fastener 106 can be unthreaded and removed from a lower part of the battery assembly 58. At that point, the battery assembly 58 can be slid downward along a battery axis A5 parallel to the down tube 72. Alternatively, the battery assembly 58 can be inserted into the down tube 72 through an opening in a side of the down tube 72.

With further reference to FIG. 6, it can be seen that the battery axis A5 along which the battery assembly 58 is inserted and removed can be offset in front of the crank axis A4. That is, the crank axis A4 can be spaced rearward of the battery axis A5 (i.e., such that the crank axis A4 is disposed between the battery axis A5 and the rear wheel 54 along a horizontal plane HP1 (seen in FIG. 16) that is defined by the crank axis A4 and is parallel to the ground). In addition, as better shown in FIG. 16, when the battery assembly 58 is installed in the down tube 72 in an installed position, the lower end of the battery housing 96 can protrude from a lower end of the down tube 72 and can be positioned below the horizontal plane HP1. In some embodiments, the battery housing has a length L of about 580 millimeters and the battery housing 96 can protrude beyond the end of the down tube by a distance D1 of about 70 millimeters. In some embodiments the length L can be 580 millimeters +/−20 percent (%). In some embodiments the distance D1 can be 70 millimeters +/−20 percent (%). In this regard, it can be seen that the battery housing 96 can protrude beyond the end of the down tube 72 by a distance D1 that is at least 5 percent (%) or at least 10 percent (%) of the length L of the battery housing 96. Such positioning of the battery assembly 58 can result in a center of mass of the battery assembly 58 being positioned lower than in other configurations, which can improve handling and maneuverability of the ebike 50. Alternatively, the battery assembly 58 can be inserted all the way into the down tube 72.

Figure 8:
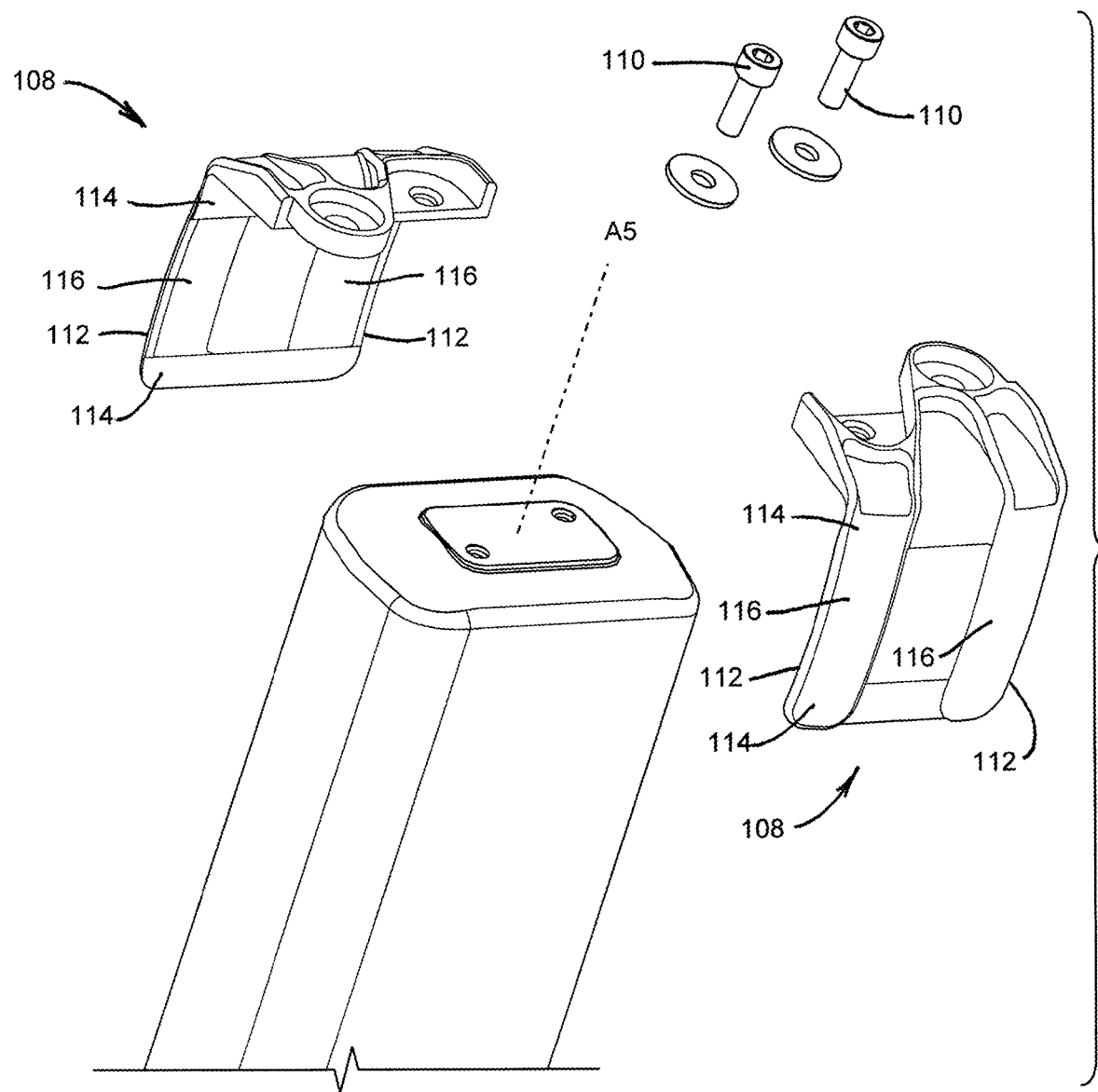
FIG. 8 is a perspective view of an upper portion of the battery assembly in FIG. 7 shown with an upper mount exploded.
Figure 9:
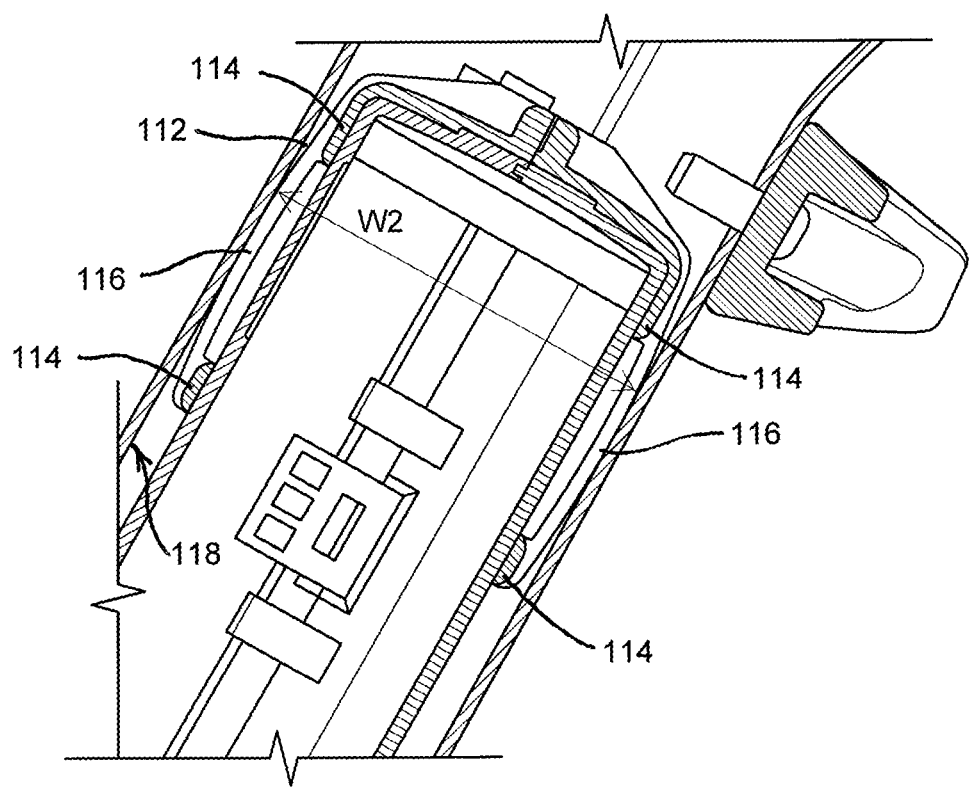
FIG. 9 is a section view of the upper portion of the battery assembly of the frame assembly in FIG. 2 taken along line 9-9 in FIG. 4.
Figure 10:
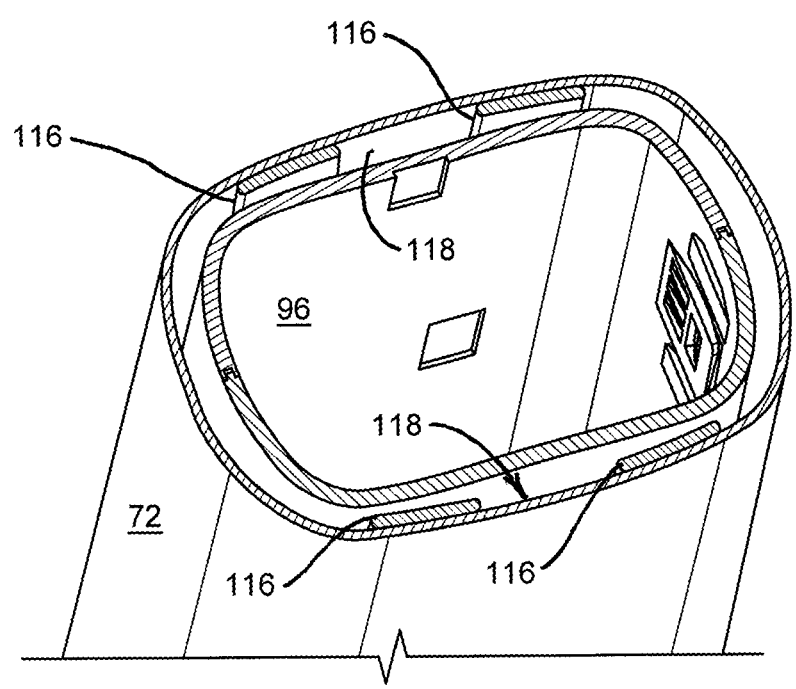
FIG. 10 is a section view of the upper portion of the battery assembly of the frame assembly in FIG. 2 taken along lone 10-10 in FIG. 2.
Figure 11:
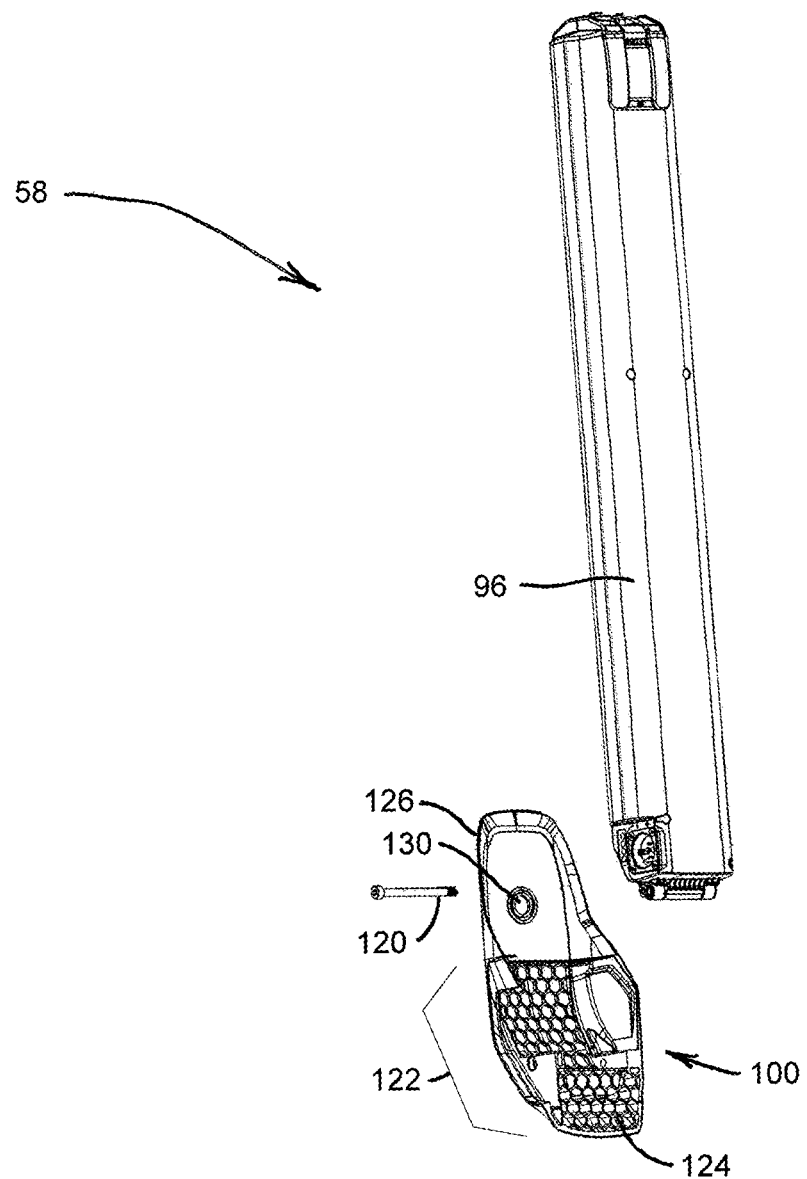
FIG. 11 is a perspective view of the battery assembly in FIG. 7 shown with a battery cover and fastener exploded.

Referring to FIGS. 7-9, the upper battery mount 98 can be attached to the upper end of the battery housing 96 and can include two opposing mount members 108. As shown in FIG. 8, the mount members 108 can be secured to an upper end of the battery housing 96 by threaded mount fasteners 110. Each mount member 108 can include resilient lateral supports that resiliently laterally support the upper end of the battery housing 96 in the down tube 72. "Lateral" refers to a direction in a plane that is substantially perpendicular to the battery axis A5. The illustrated resilient lateral supports can be in the form of two flexures 112 that are slightly curved such that ends 114 of the flexures 112 contact the battery housing 96, and centers 116 of the flexures 112 can be spaced from the battery housing 96. The two flexures 112 of each mount member 108 can be positioned in opposing relation to the two flexures 112 of the other mount member 108. The flexures 112 can be resilient such that pressing the center 116 of a flexure 112 causes the center 116 to flex toward the battery housing 96, and releasing the center 116 of the flexure 112 causes the center 116 to flex back to its original shape. The illustrated flexures 112 are a single-layer leaf spring configuration, but the flexures 112 could instead be any suitable arrangement, such as cantilevered or torsional. Further, while the illustrated flexures 112 are shown as separate pieces attached to the battery housing 96, the flexures 112 could instead be formed integrally with the battery housing 96.

Referring to FIGS. 6 and 9, a width W1 of the upper battery mount 98 across the centers 116 of the uncompressed flexures 112 can be dimensioned to be slightly larger than an interior width W2 of the down tube 72 at the upper end of the down tube 72 at the location where the upper battery mount 98 is positioned when the battery assembly 58 is installed in the down tube 72. This interference fit will result in the flexures 112 flexing inwardly toward the battery housing 96 when the battery assembly 58 is inserted into the down tube 72. This creates a resiliently biased interface between the upper end of the battery assembly 58 and an inner surface 118 of the down tube 72. The flexures 112 can be made of any suitably resilient material, such as reinforced plastic, aluminum, or steel.

In order to facilitate the easy insertion of the battery assembly 58 into the down tube 72, the inner surface 118 of the down tube 72 can be tapered in a converging manner from a larger dimension at its lower end to a smaller dimension at its upper end. When the upper battery mount 98 is first inserted into the lower end of the down tube 72, there can be a loose fit between the upper battery mount 98 and the down tube 72. This can make it easier to initiate insertion of the battery assembly 58 into the down tube 72. As the battery assembly 58 is slid further into the down tube 72, the upper battery mount 98 can slide along the converging taper of the inner surface 118 of the down tube 72. As the upper battery mount 98 approaches the upper end of the down tube 72, the flexures 112 can start to become compressed by the inner surface 118 of the down tube 72. When the upper battery mount 98 is at its fully inserted position, it can be held laterally in place due to the resilient flexing of the flexures 112 against the walls of the down tube 72.

Referring to FIGS. 6, 7, 11, and 12, the battery cover 100 can be secured to a lower end of the battery housing 96, such as, for example, by a fixing bolt 120. The battery cover 100 can be made of an impact-absorbing material, such as Polycarbonate/ABS compound, carbon fiber, aluminum, or any type of plastic, and can provide protection to both the exposed lower end of the battery housing 96 and a lower end of the down tube 72. The battery cover 100 can include an energy-absorbing zone 122 that it designed to absorb impact. For example, the energy-absorbing zone 122 can comprise a honeycomb cell structure 124.

An upper end of the battery cover 100 can include a skid plate 126 that, when the battery cover 100 is secured to the battery housing 96, is spaced from the battery housing 96 by a gap 128. This gap 128 can provide a cavity in which the lower end of the down tube 72 can be positioned when the battery assembly 58 is fully inserted into the frame structure 62. More specifically, as the battery housing 96 is slid into the down tube 72, the skid plate 126 can slide over an outer surface of the lower end of the down tube 72, causing the lower end of the down tube 72 to slide into the gap 128. The result can be that a lower end of the down tube 72 is protected by the skid plate 126.

Figure 12:
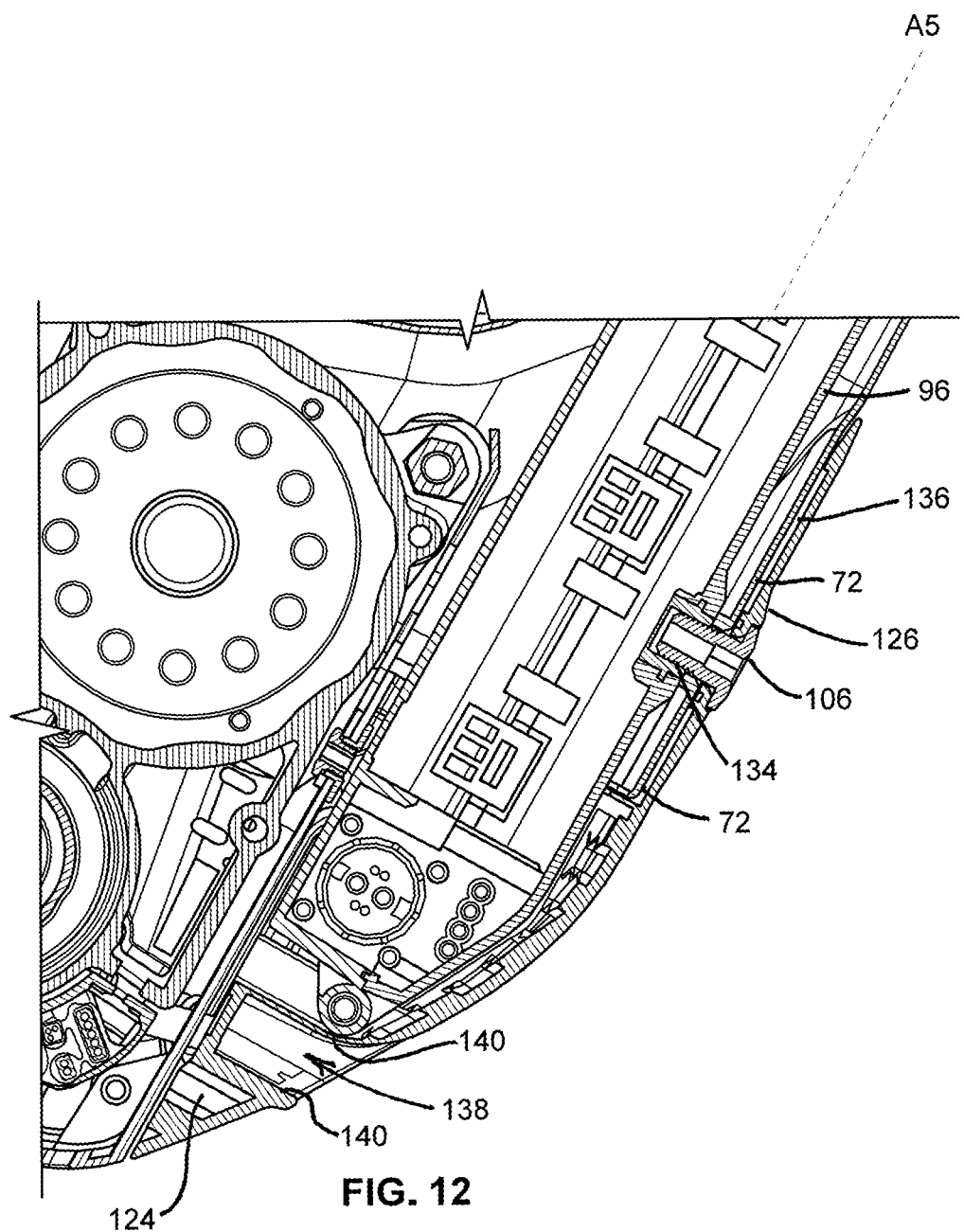
FIG. 12 is a section view of a lower portion of the frame assembly in FIG. 2 taken along line 12-12 in FIG. 4.

Referring to FIGS. 6, 7, and 11-13, the lower end of the battery assembly 58 is secured to the down tube 72 by the battery fastener 106. For example, the battery fastener 106 can be a threaded bolt that is inserted through a plate hole 130 in the skid plate 126, through a tube hole 132 in the down tube 72, and into a threaded hole 134 in the battery housing 96. As shown in FIG. 12, in some embodiments with the battery fastener 106 threaded all the way into the threaded hole 134, there can be a small air gap 136 between the down tube 72 and portions of the skid plate 126. This air gap 136 can facilitate a certain amount of flexing of the skid plate 126 upon impact, thereby providing further protection to the lower end of the down tube 72.

Referring to FIGS. 5, 7, and 12, the lower end of the battery cover 100 can include a finger hold in the form of a recess 138 that can be dimensioned to receive one or more fingers of a user to facilitate removal of the battery assembly 58 from the down tube 72. The recess 138 can be defined by upper and lower walls 140 that are substantially perpendicular to the battery axis A5 to thereby enhance finger engagement. To remove the battery assembly 58, the battery fastener 106 can be removed, and then the user can grab the finger hold and pull the battery assembly 58 downward along the battery axis A5. The finger hold also can provide a convenient way to carry the battery assembly 58 when transporting for charging.

Figure 13:
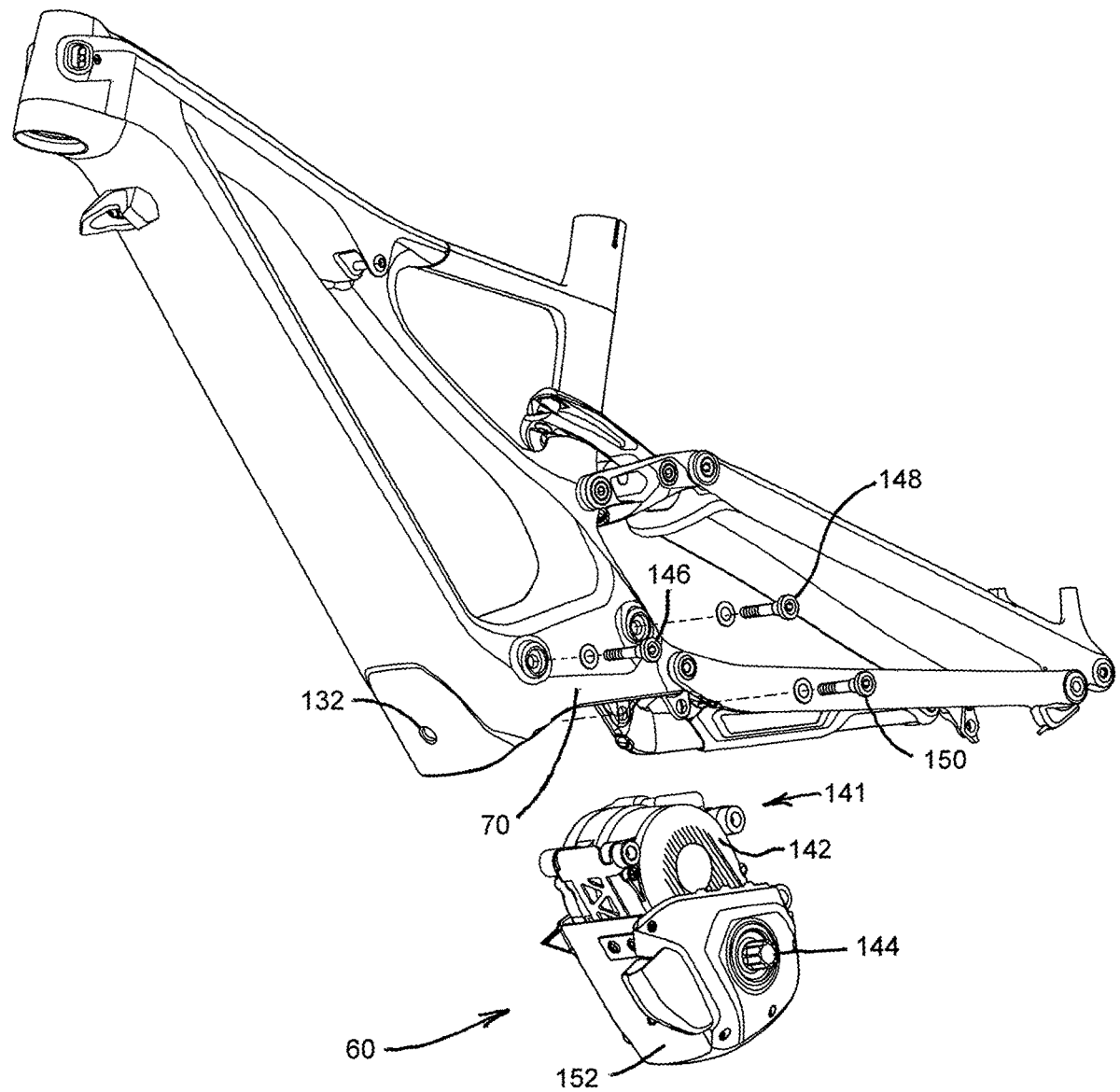
FIG. 13 is a perspective view of the motor assembly of the frame assembly in FIG. 2, including an electric motor and a motor cover, shown exploded from the frame structure of the frame assembly.
Figure 14:
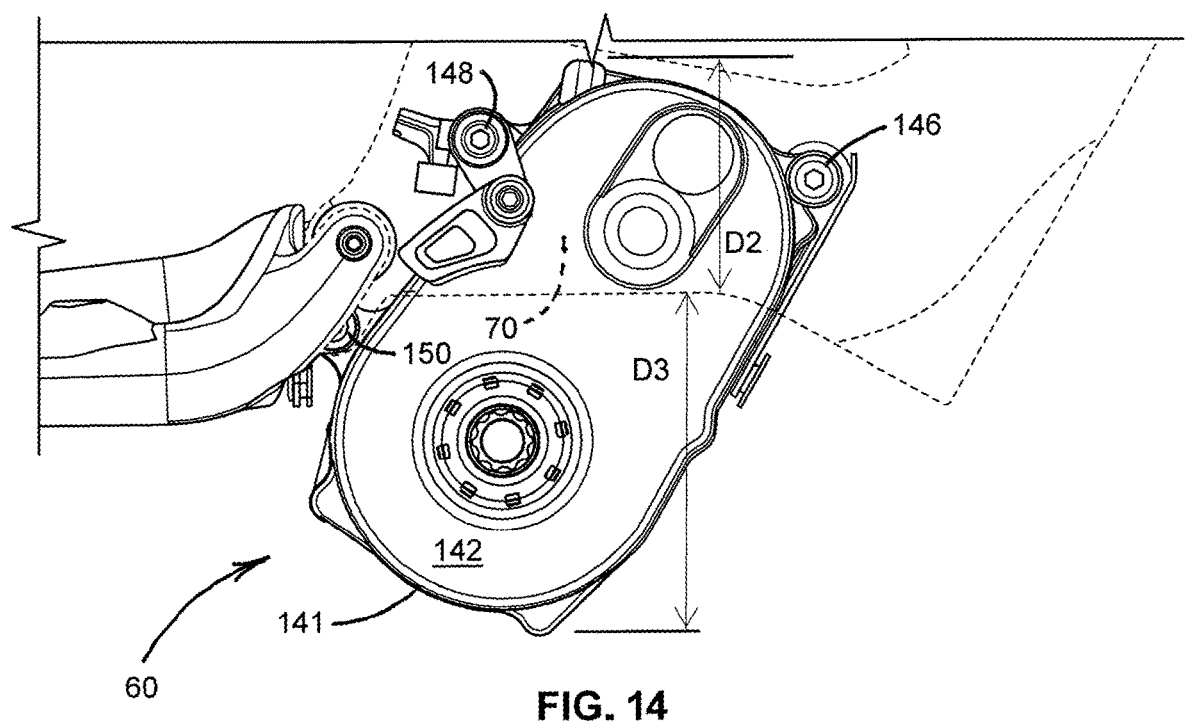
FIG. 14 is a right side view of the frame structure and electric motor in FIG. 13 with the frame structure shown in dashed lines and the motor cover removed.
Figure 15:
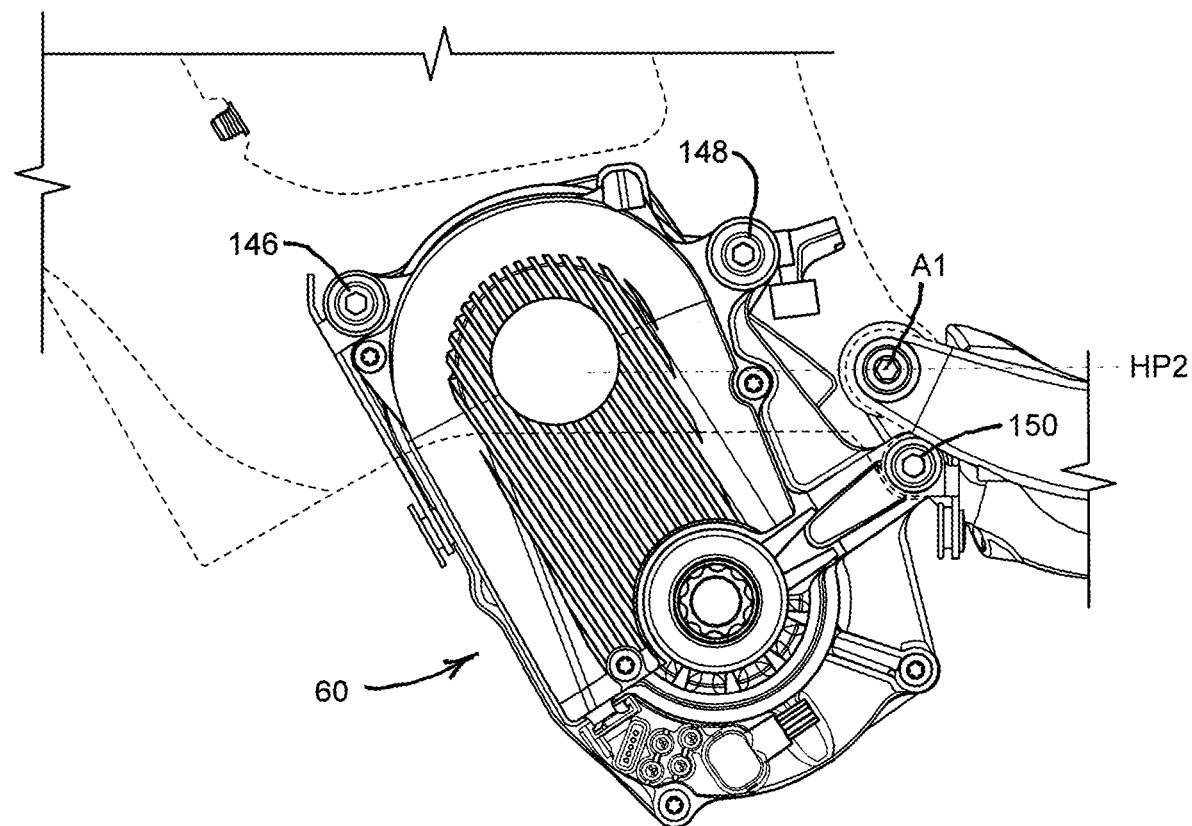
FIG. 15 is a left side view of the frame structure in FIG. 13 and a motor housing of the electric motor in FIG. 13 with the frame structure shown in dashed lines and the motor cover removed.

Referring to FIGS. 13-15, the motor assembly 60 comprises an electric motor 141 having a motor housing 142 and an output shaft 144 that directly drives the crank assembly 94. Each side of the electric motor 141 can be mounted to the bottom shell 70 by a front upper fastener 146, a rear upper fastener 148, and/or a lower fastener 150. Specifically, each of the fasteners 146, 148, 150 can extend through a corresponding opening in the bottom shell 70 and can be threaded into a nut or threaded opening in the motor housing 142. Other types of fasteners can be implemented in other embodiments. Referring to FIG. 15, it can be seen that the lower fastener 150 can be positioned below (lower than) a horizontal plane HP2 that is parallel to the ground through the lower pivot axis A1, and the rear upper fastener 148 can be positioned above (higher than) the horizontal plane HP2. Alternatively, the lower fastener and rear upper fastener both can be positioned above the horizontal plane HP2.

As shown in FIG. 13, the motor assembly 60 further can include a motor cover 152 coupled to the motor housing 142 in order to protect the electric motor 141 from damage due to impact. The motor cover 152 can be made of an impact-absorbing material, such as Polycarbonate/ABS compound, carbon fiber, aluminum, or any type of plastic.

Referring to FIGS. 14-15, it can be seen that the electric motor 141 (as evidenced by the motor housing 142) can be partially recessed into the bottom shell 70 of the frame structure 62, and that a portion (e.g., substantial portion or majority) of the electric motor 141 can hang below the bottom shell 70. In the illustrated embodiment, the distance D2 that the electric motor 141 extends vertically into the bottom shell 70 can be 83 millimeters, and the distance D3 that the electric motor 141 hangs below the bottom shell 70 can be 115 millimeters. In other embodiments the distance D2 can be 80 millimeters +/−20 millimeters. In these and other embodiments the distance D3 can be 120 millimeters +/−20 millimeters. By virtue of this arrangement, the motor housing 142 can be used as a stressed member, and there can be no need to extend the frame structure 62 all the way down to the lower end of the electric motor 141, resulting in a substantial weight reduction to the main frame 64.

Figure 16:
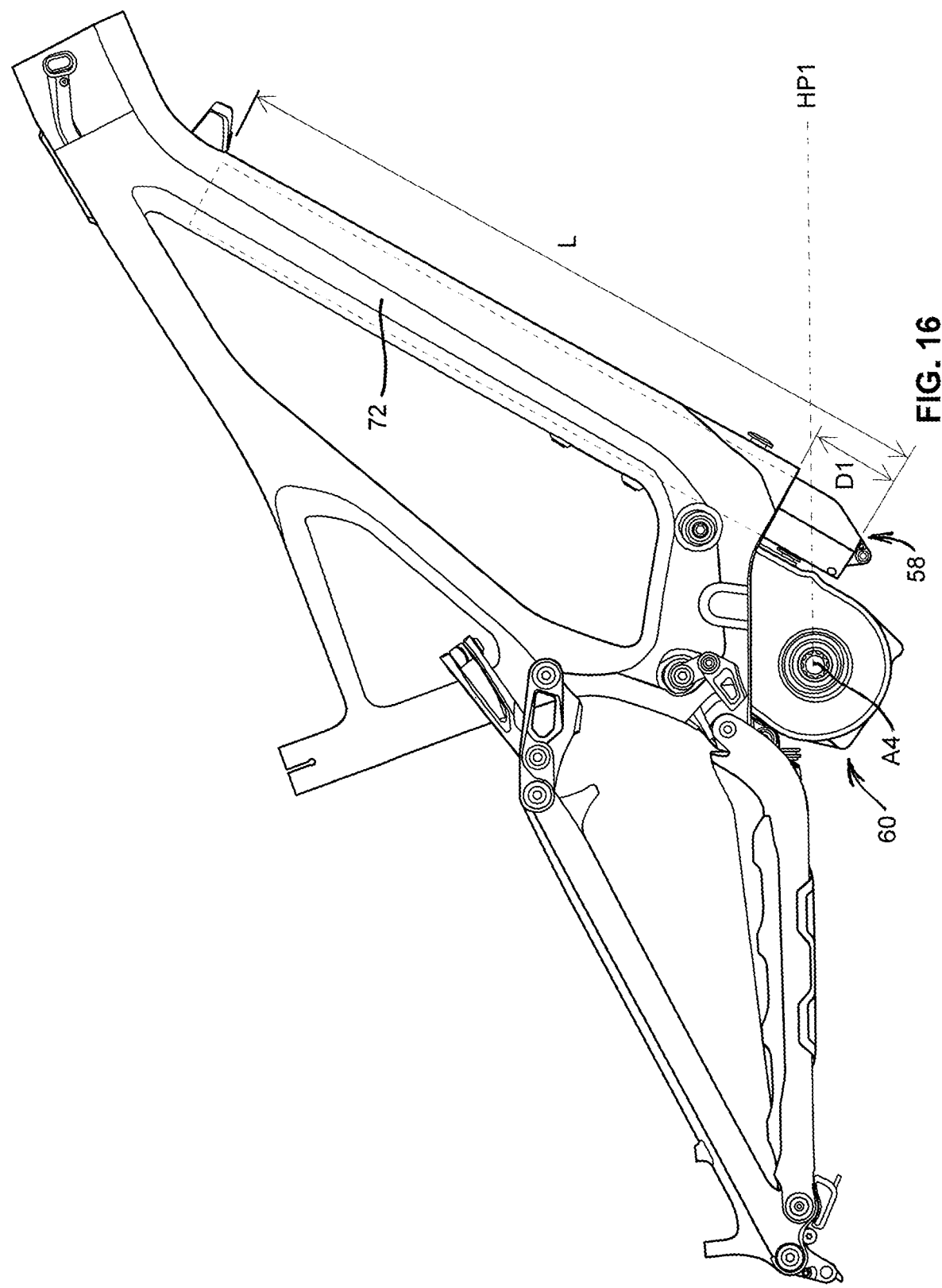
FIG. 16 is a right side view of the frame assembly in FIG. 13 with the motor cover and battery cover removed.
Figure 17:
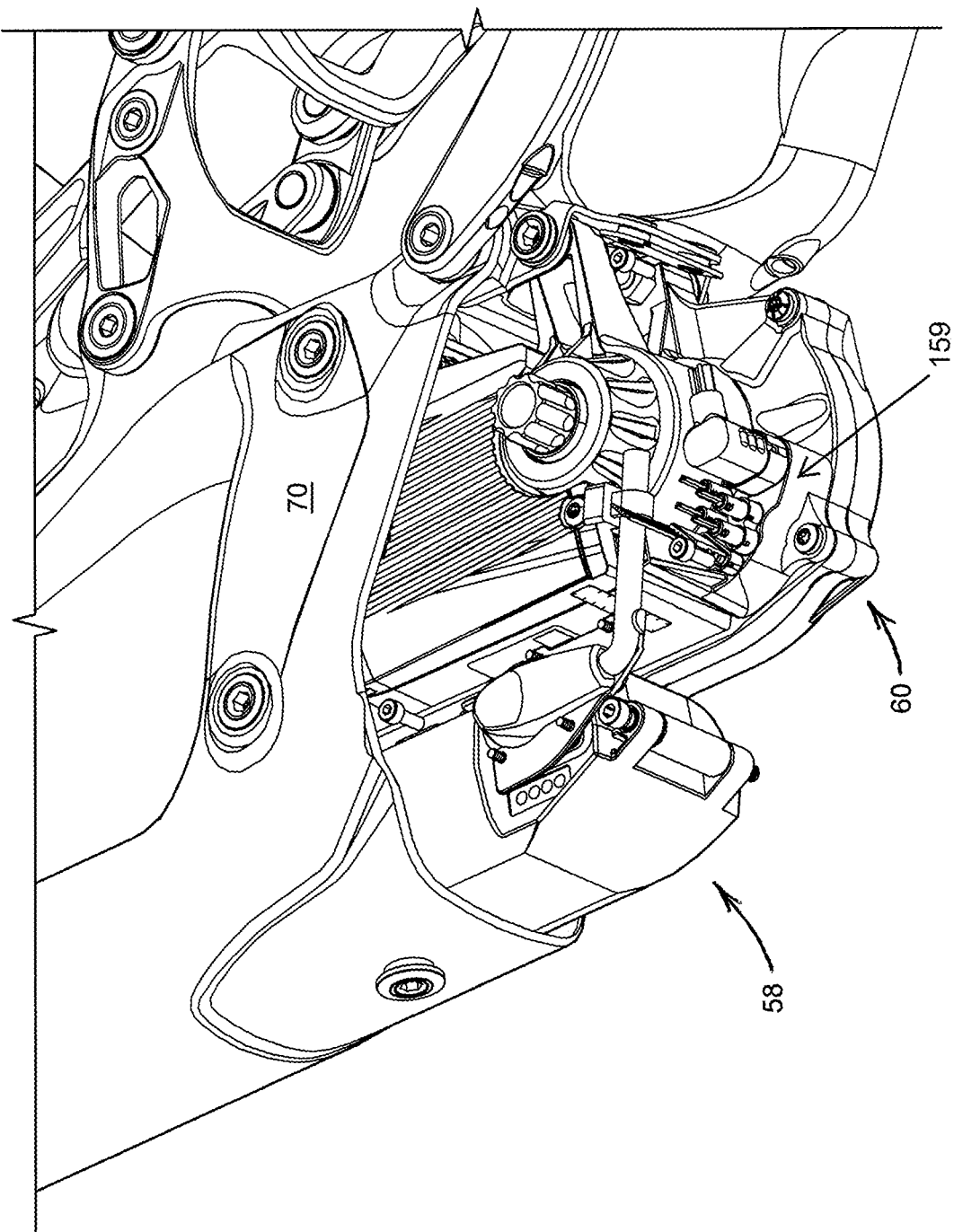
FIG. 17 is a left front perspective view of the frame assembly in FIG. 13 with the motor cover and battery cover removed.

Referring to FIGS. 16-17, it can be seen that both the motor assembly 60 and the battery assembly 58 can extend below a lowermost part of the main frame 64. Such an arrangement can result in a frame structure 62 that is lighter in weight than an implementation positioning the motor assembly 60 and/or the battery assembly 58 above the lowermost part of the main frame 64. In addition, this arrangement can facilitate the removal of the motor assembly 60 and battery assembly 58 from the main frame 64.

Figure 18:
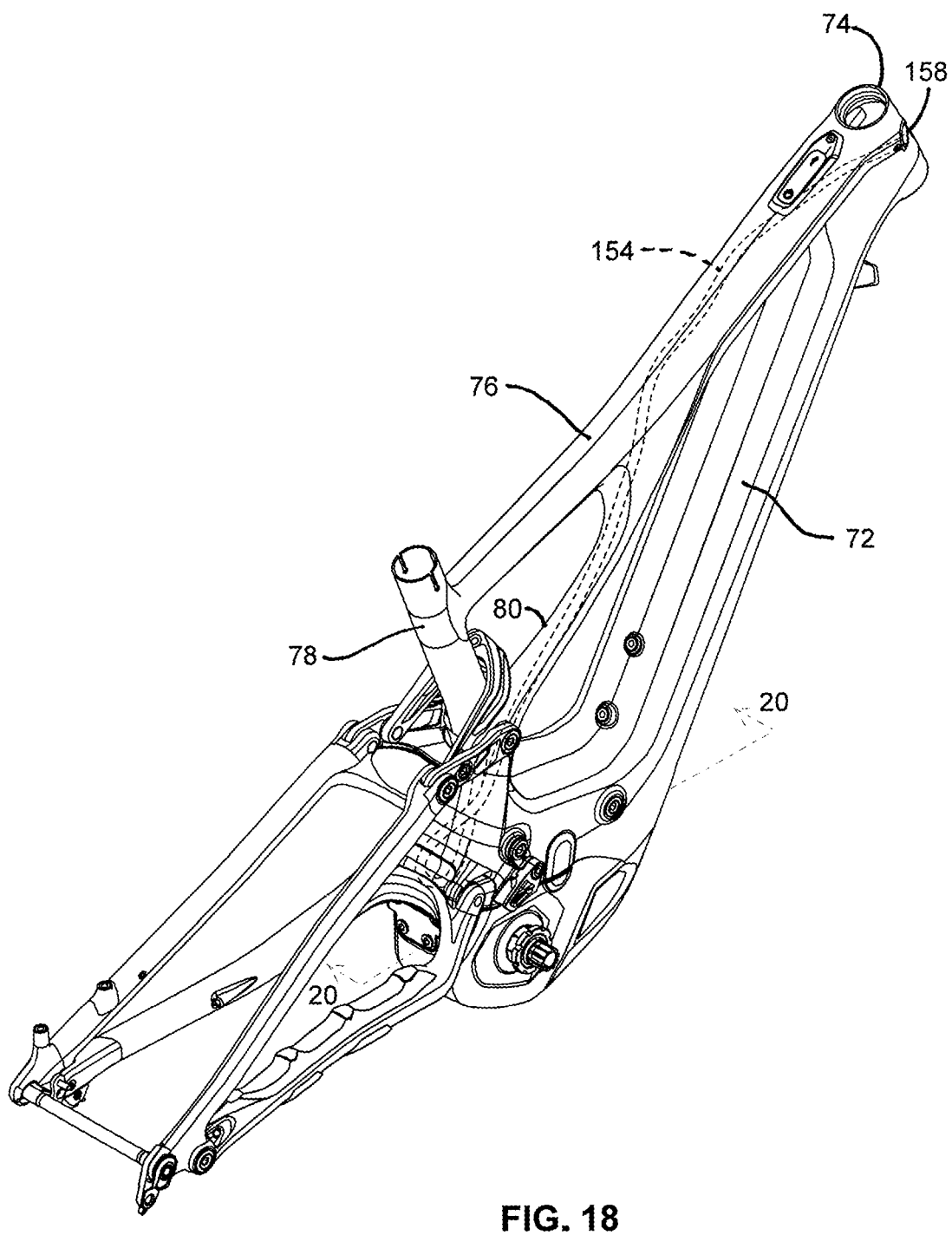
FIG. 18 is a rear perspective view of the frame assembly in FIG. 2 showing the position of an internal routing tube.

Referring to FIG. 18, the ebike 50 further can include an internal routing tube 154 that is adapted to receive and guide multiple actuator housings through the inside of the main frame 64. For example, the actuator housings can be mechanical cable housings, electrical cable housings, or hydraulic fluid housings. In the illustrated embodiment, the routing tube 154 can comprise a hollow tube made of Nylon, carbon fiber, aluminum, or any type of plastic and can have an inner diameter of about 7 millimeters. In other embodiments the inner diameter can be 7 millimeters +/−1 millimeters. A front end of the routing tube 154 can be accessed at a front opening 158 along the right side of the head tube 74 of the main frame 64. The routing tube 154 can pass through a front portion of the top tube 76, through the side tube 80, and into the seat tube 78 of the main frame 64. From there, an individual housing (e.g., electrical or mechanical) can travel further toward the intended destination. For example, a rear hydraulic brake housing can exit the main frame 64 and enter one or both of the chainstays 82 to travel toward a rear brake (not illustrated). Motor and battery control cables can exit the routing tube 154 and travel toward a motor and battery controller 159 mounted to the motor housing 142 under the motor cover 152. The motor and battery controller 159 can be part of and/or coupled to any of a variety of components, including the motor assembly 60, battery assembly 58, or user interface 93. In some embodiments, the motor and battery controller 159 can comprise a processor and memory configured to store computer instructions configured to run on the processor.

It is noted that passing the routing tube 154 through the top tube 76 and side tube 80 can avoid passing housings through the down tube 72, thereby allowing the battery assembly 58 to use up the volume inside the down tube 72, permitting more battery capacity of battery assembly 58. Further, eliminating housings in the down tube 72 can facilitate a reduction in size (e.g., width) of the down tube 72, which can result in a more aesthetically pleasing main frame 64. Further, eliminating housings from the down tube 72 can mitigate or eliminate potential damage to the housings upon insertion and removal of the battery assembly 58.

Figure 19:
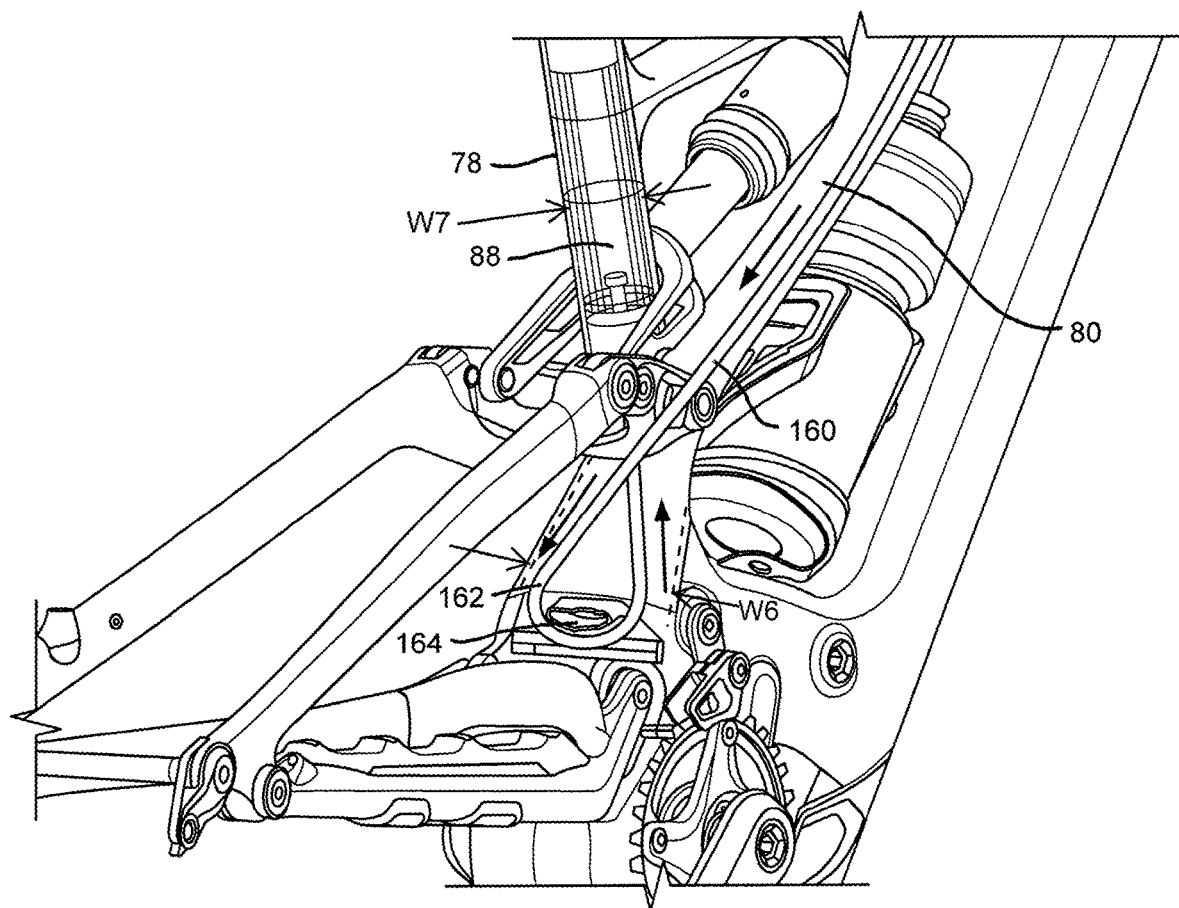
FIG. 19 is a rear perspective view of the frame assembly in FIG. 2 with a portion of the frame structure removed to show a cable housing loop leading to a dropper seat post.
Figure 20:
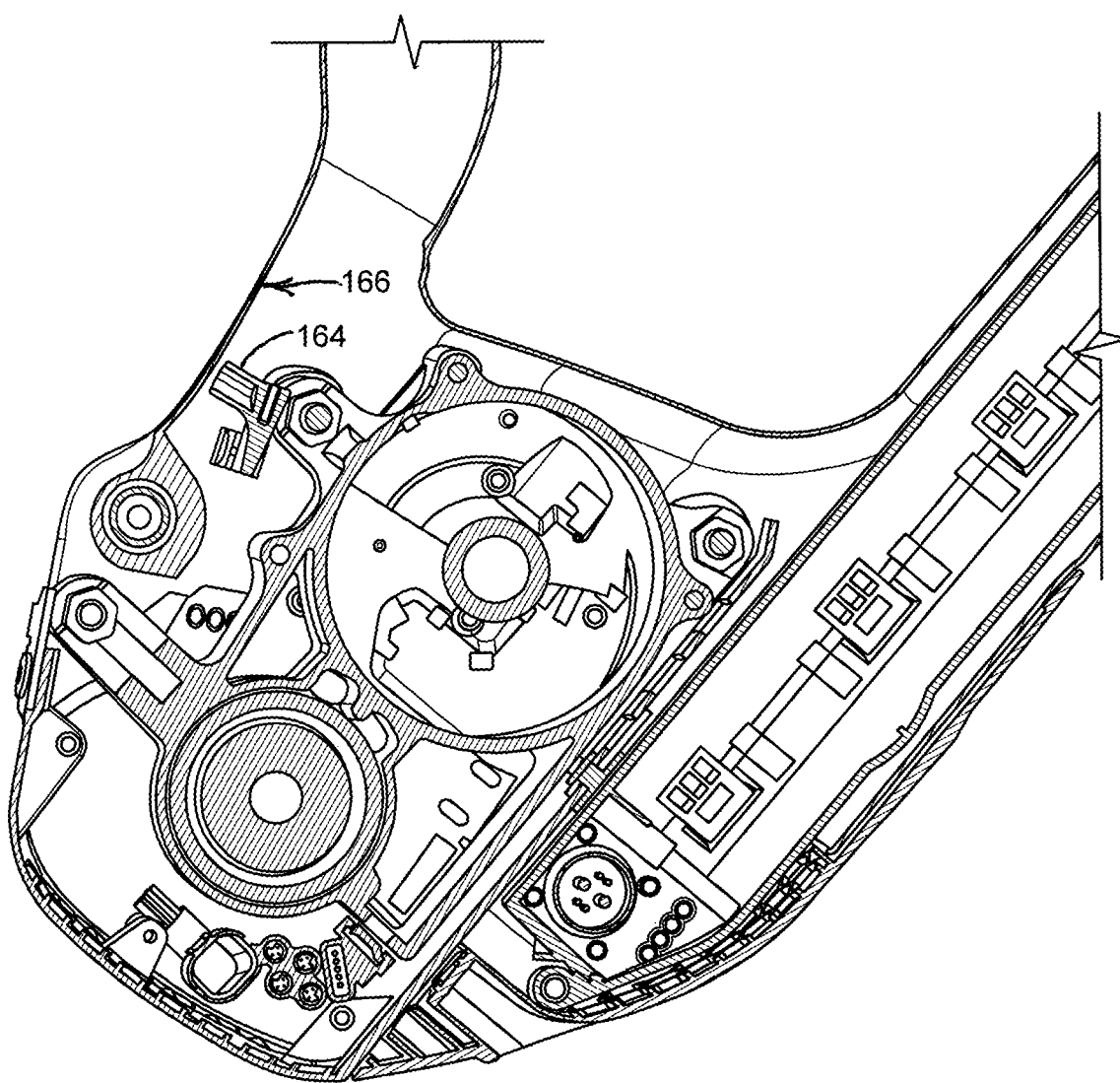
FIG. 20 is a section view of the frame assembly in FIG. 18 taken along line 20-20 in FIG. 18.
Figure 21:
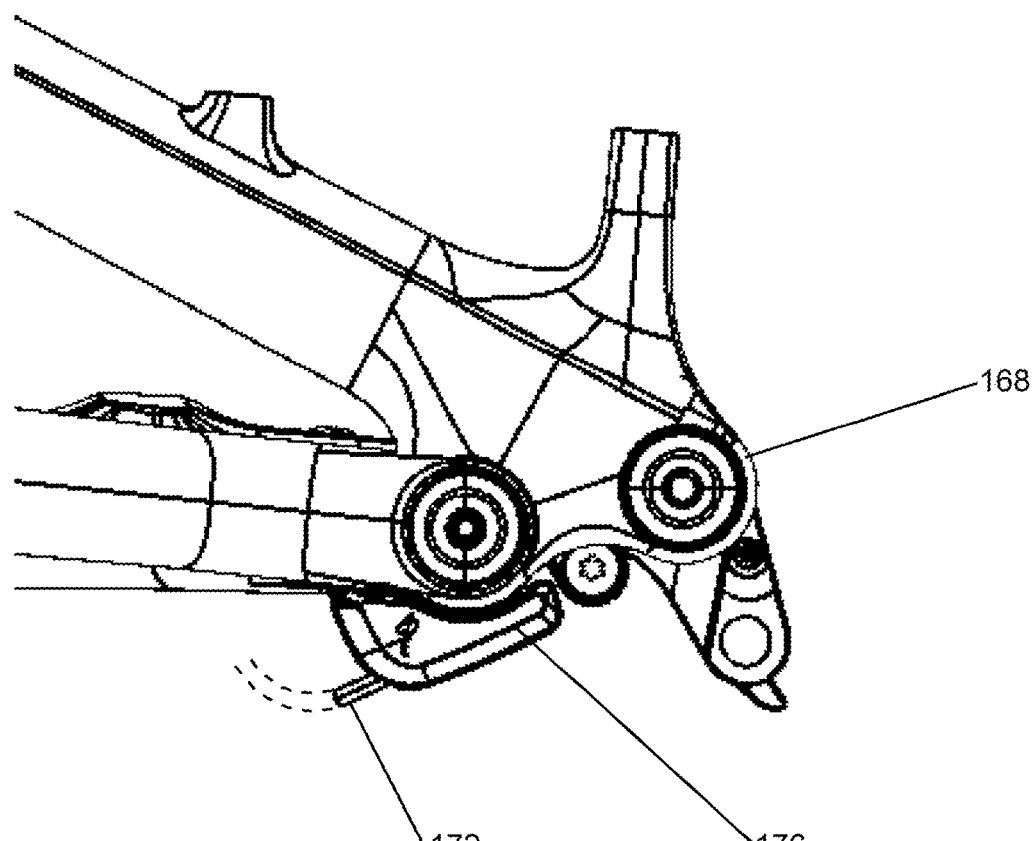
FIG. 21 is an enlarged side view of a left rear wheel support of the frame structure in FIG. 2 and showing a speed sensor assembly and sensor support.

One housing that can be inserted through the routing tube 154 can be a control housing 160 for the dropper seat post 88, which is shown in FIGS. 18-20. The dropper seat post 88 can receive the control housing 160 from its bottom end. As can be seen from the side view of the ebike 50 in FIG. 2, passing the control housing 160 from the side tube 80 to the upper portion of the seat tube 78 can result in a sharp turn of the control housing 160 of an upper acute angle a at the intersection of the side tube 80 and seat tube 78. In order to avoid this sharp turn of the control housing 160, the control housing 160 can be formed into a loop 162 inside the frame structure 62 below the intersection and below the dropper seat post 88 so that there is gradual redirection of the control housing 160 from the side tube 80 to the seat tube 78. The inner width W6 of the frame structure 62 at the location of the loop 162 (about 60 millimeters) can be larger than an inner width W7 of the upper portion of the seat tube 78 (about 31 millimeters) where the seat post 88 is located, and also can be larger than the width of the loop 162. This loop 162 can be maintained by a loop stay 164 that can be secured to the motor housing 142 by the rear upper fasteners 148. Further, the loop stay 164 can be positioned close to an inside surface 166 of the bottom shell 70 so that the control housing 160 cannot pass between. By virtue of the loop stay 164 being positioned below the dropper seat post 88, the control housing 160 can exit the side tube 80, wrap gradually around the loop stay 164, and then extend up toward the bottom end of the dropper seat post 88.

Referring to FIGS. 21-25, the ebike 50 can further include a speed sensor assembly configured to measure the speed of the ebike 50. The speed sensor assembly can be mounted on a left chainstay of the chainstays 82 immediately in front of a rear wheel support 168. Other mounting locations, such as, for example, the seatstay, fork, or dropout, are possible. The speed sensor assembly can include a sensor unit 170 and a sensor wire 172 coupling the sensor unit 170 to the motor and battery controller 159 (FIG. 17). The sensor unit 170 can comprise an inductive sensor configured to sense a presence of a magnet attached to the rear wheel 54. The magnet can be secured to the rear wheel 54 at a location spaced from a rotational axis of the rear wheel 54 so that, as the rear wheel 54 rotates, the magnet moves in a circular path. For example, the magnet can be attached to a wheel spoke or to a rear brake disk. The sensor unit 170 can be positioned in sufficiently close proximity to the circular path such that it can sense the magnet as the magnet passes by as the rear wheel 54 rotates. The processor can receive information from the sensor unit 170 relating to the rate at which the magnet, and thus the rear wheel 54, is rotating. Given a known wheel circumference, the processor can calculate the ebike speed using well known formulas.

Figure 22:
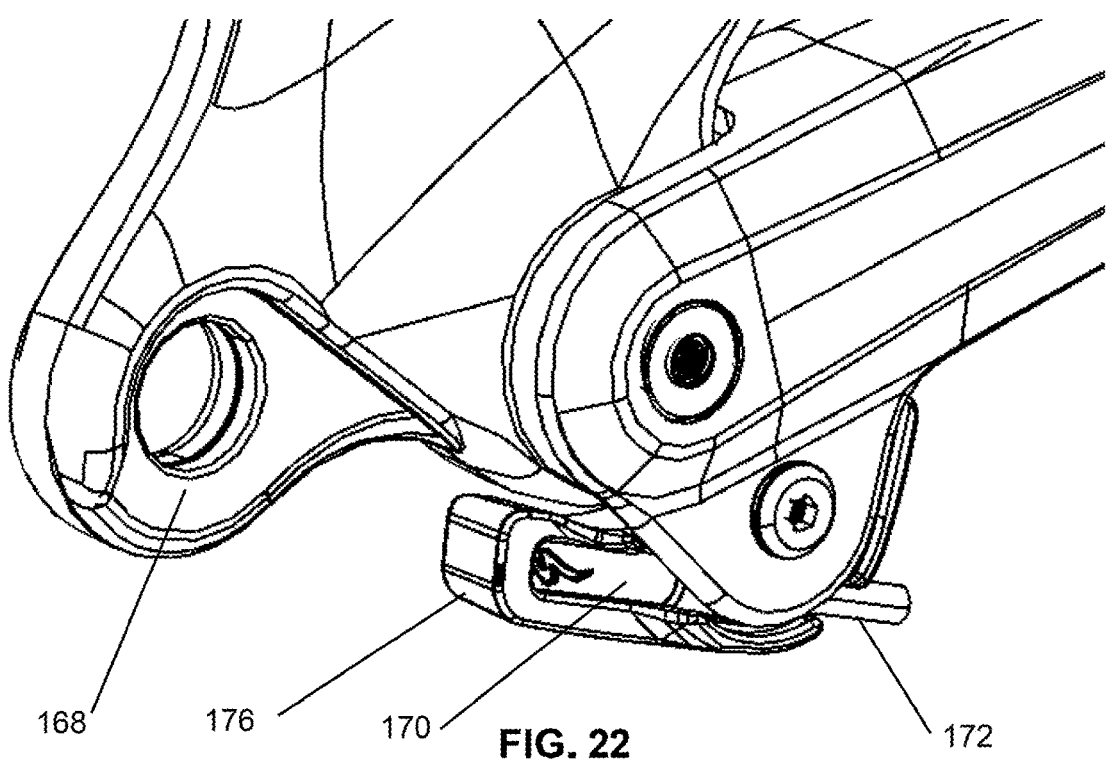
FIG. 22 is a right rear perspective view of the left rear wheel support, speed sensor assembly, and sensor support in FIG. 21.
Figure 23:
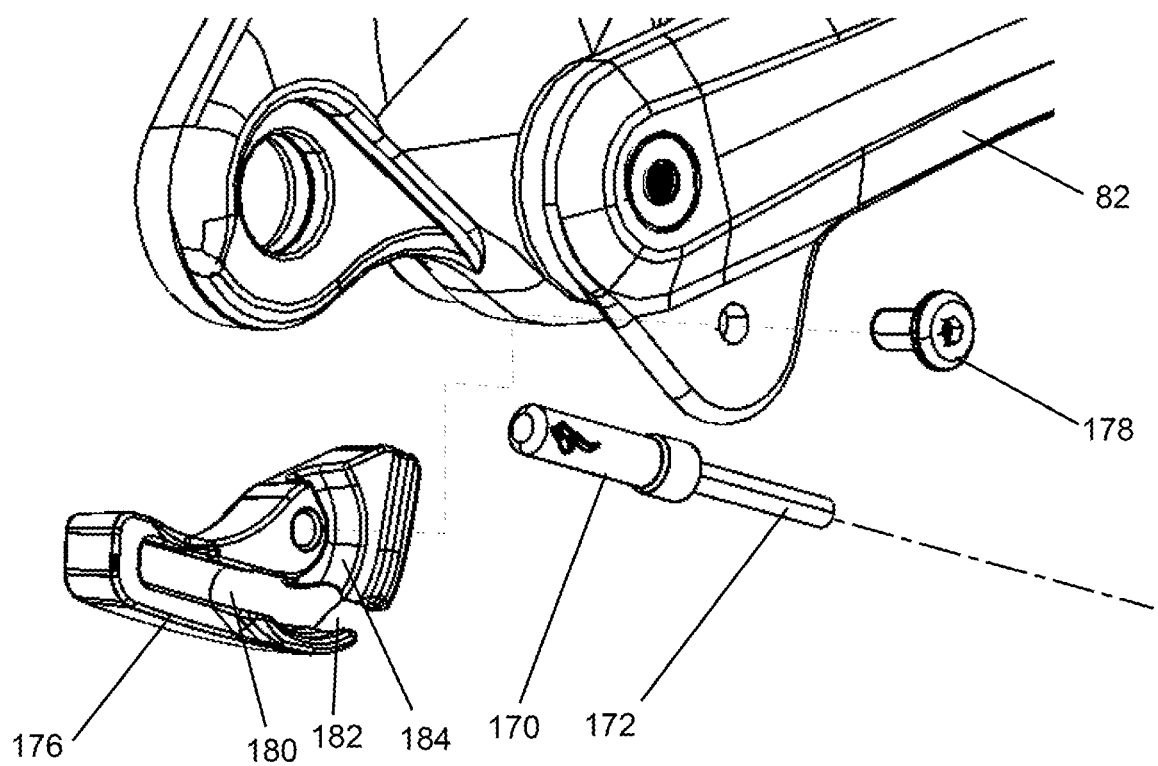
FIG. 23 is an exploded view of the speed sensor in FIG. 21.
Figure 24:
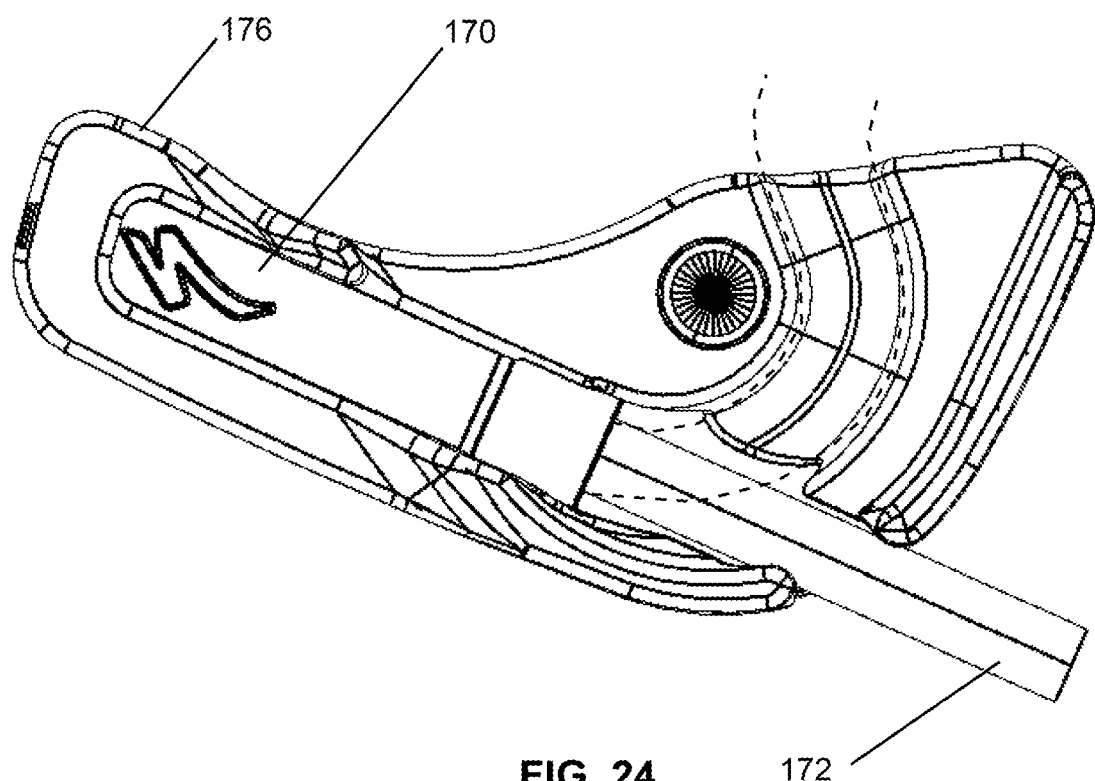
FIG. 24 is a right side view of the speed sensor assembly and sensor support in FIG. 21.

The sensor unit 170 can be coupled to the left chainstay of the chainstays 82 of the frame structure 62 using a sensor mount 176 that is attached to the left chainstay 82 by a mount fastener 178, as shown in FIG. 22-24. In the attached position, the sensor mount 176 can sandwich the sensor unit 170 between the sensor mount 176 and the chainstay 82. In order to further secure the sensor unit 170, the sensor mount 176 can include a first recess 180 shaped to receive the sensor unit 170 and a second recess 182 shaped to receive the sensor wire 172. In some embodiments, the first recess 180 and the second recesses 182 can be elongated, semi-cylindrically-shaped recesses that are aligned with each other so that the aligned orientation of the sensor unit 170 and sensor wire 172 is maintained.

The sensor mount 176 can further include a third recess 184 dimensioned to receive the sensor wire 172 in a different orientation than the second recess 182. The third recess 184 can be curved so that the sensor wire 172 can be guided upward into the chainstay 82. Such a configuration can facilitate routing the sensor wire 172 through the chainstay 82, if desired.

Figure 25:
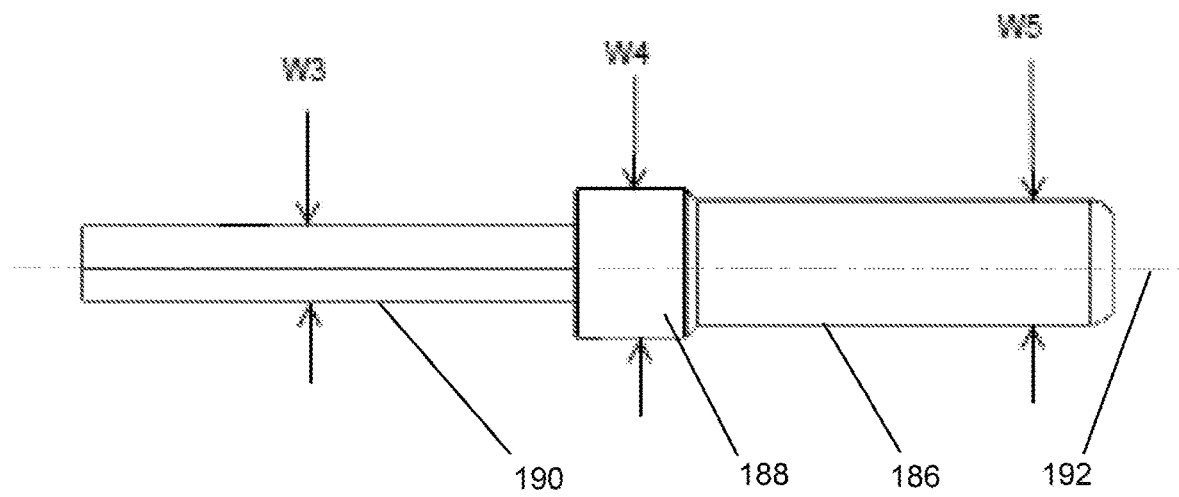
FIG. 25 is a side view of the speed sensor assembly in FIG. 21.

Referring to FIG. 25, the speed sensor can be designed to be low profile, which makes the speed sensor usable in a variety of applications, such as, for example, in different locations on different types of bicycles, and further enhances the ability to thread the speed sensor through small openings. The sensor unit 170 can include a cylindrically-shaped body 186 and a cylindrically-shaped collar 188 on one end of the cylindrically-shaped body 186. The sensor wire 172 includes an outer housing 190 that also can be cylindrically shaped and can be secured to the end of the collar 188 such that the sensor wire 172 and sensor unit 170 are coaxially aligned with each other, thus defining a sensor axis 192. It should be understood that the cylindrically-shaped body 186, cylindrically-shaped collar 188, and sensor wire 172 can be implemented with different shapes (e.g., elliptical, rectangular, square, etc.) than are shown in the drawings.

The low profile characteristic of the speed sensor assembly can be facilitated by making the sensor unit 170 only slightly larger than the sensor wire 172. That is, the sensor wire 172 can have a maximum width W3 (perpendicular to the sensor axis 192) of about 3 millimeters +/−5 percent (%), the sensor unit 170 can have a maximum width W4 at the collar 188 that is about 6 millimeters +/−5 percent (%), and the sensor unit 170 can have a minimum width W5 at the body that is about 5 millimeters +/−5 percent (%). Accordingly, it can be seen that the sensor unit 170 has a maximum width that is about two times the width of the sensor wire 172.

Although illustrated in connection with an ebike, it should be understood that many of the features described herein, including housings through the side tube, the loop stay, and the speed sensor, are applicable to standard bicycles in addition to ebikes.

Various features and advantages of the invention are set forth in the following claims.

What is claimed is:

1. An ebike comprising:
a front wheel;
a rear wheel;
a frame structure supported on the front wheel and the rear wheel, the frame structure including a main frame and further including a rear frame pivotally coupled to the main frame at a lower pivot axis defining a horizontal plane, wherein the main frame includes a head tube, a down tube, a seat tube, and a bottom shell coupling the down tube to the seat tube, the bottom shell including sidewalls at least partially defining a hollow interior; and
a motor assembly having an upper motor portion positioned in the hollow interior of the bottom shell and a lower motor portion hanging below the bottom shell, the motor assembly being secured to the bottom shell by a lower fastener below the horizontal plane and an upper fastener above the horizontal plane.

2. An ebike as claimed in claim 1, wherein the bottom shell includes a downwardly facing opening at least partially defined by lower edges of the sidewalls.

3. An ebike as claimed in claim 1, further comprising a battery assembly at least partially positioned in the hollow interior of the bottom shell, the battery assembly including a lower battery portion hanging below the bottom shell.

4. An ebike as claimed in claim 3, wherein the down tube defines a down tube axis, and wherein the battery assembly is slidable from the bottom shell along a battery axis that is parallel to the down tube axis when the motor assembly is secured to the bottom shell.

5. An ebike as claimed in claim 3, wherein the lower motor portion and the lower battery portion are positioned lower than the main frame.

6. An ebike as claimed in claim 3, wherein the lower motor portion and the lower battery portion are positioned lower than the rear frame.

7. An ebike as claimed in claim 3, wherein each one of the battery assembly and the motor assembly is able to be removed from the main frame without another one of the battery assembly and motor assembly being removed from the main frame.

8. An ebike as claimed in claim 1, wherein no portion of the main frame is positioned below the motor assembly, and wherein the ebike further comprises a motor cover enclosing the lower motor portion.

9. An ebike comprising:
a front wheel;
a rear wheel;
a frame structure supported on the front wheel and the rear wheel, the frame structure including a main frame having a head tube, a down tube, a seat tube, and a bottom shell coupling the down tube to the seat tube, the bottom shell including sidewalls at least partially defining a hollow interior;
a motor assembly having an upper motor portion positioned in the hollow interior of the bottom shell and a lower motor portion hanging below the bottom shell; and
a battery assembly at least partially positioned in the hollow interior of the bottom shell, the battery assembly including a lower battery portion hanging below the bottom shell.

10. An ebike as claimed in claim 9, wherein the lower motor portion and the lower battery portion are positioned lower than the main frame.

11. An ebike as claimed in claim 9, wherein the lower motor portion and the lower battery portion are positioned lower than the rear frame.

12. An ebike as claimed in claim 9, wherein each one of the battery assembly and the motor assembly is able to be removed from the main frame without another one of the battery assembly and motor assembly being removed from the main frame.

13. An ebike as claimed in claim 9, wherein the down tube defines a down tube axis, and wherein the battery assembly is slidable from the bottom shell along a battery axis that is parallel to the down tube axis when the motor assembly is secured to the bottom shell.

14. An ebike as claimed in claim 9, wherein no portion of the main frame is positioned below the motor assembly, and wherein the ebike further comprises a motor cover enclosing the lower motor portion.

15. An ebike frame assembly comprising:
a frame structure adapted to be supported on a front wheel and a rear wheel, the frame structure including a main frame having a head tube, a down tube, a seat tube, and a bottom shell coupling the down tube to the seat tube, the bottom shell including sidewalls at least partially defining a hollow interior;
a motor assembly having an upper motor portion positioned in the hollow interior of the bottom shell and a lower motor portion hanging below the bottom shell; and
a battery assembly at least partially positioned in the hollow interior of the bottom shell, the battery assembly including a lower battery portion hanging below the bottom shell.

16. An ebike frame assembly as claimed in claim 15, wherein the lower motor portion and the lower battery portion are positioned lower than the main frame when the frame structure is supported on a front wheel and a rear wheel.

17. An ebike frame assembly as claimed in claim 15, wherein the frame structure further includes a rear frame coupled to the main frame, and wherein the lower motor portion and the lower battery portion are positioned lower than the rear frame when the frame structure is supported on a front wheel and a rear wheel.

18. An ebike frame assembly as claimed in claim 15, wherein each one of the battery assembly and the motor assembly is able to be removed from the main frame without another one of the battery assembly and motor assembly being removed from the main frame.

19. An ebike frame assembly as claimed in claim 15, wherein the down tube defines a down tube axis, and wherein the battery assembly is slidable from the bottom shell along a battery axis that is parallel to the down tube axis when the motor assembly is secured to the bottom shell.

20. An ebike frame assembly as claimed in claim 15, wherein no portion of the main frame is positioned below the motor assembly when the frame structure is supported on a front wheel and a rear wheel, and wherein the ebike frame assembly further comprises a motor cover enclosing the lower motor portion.

\* \* \* \* \*